(12) United States Patent
Mindlin

(10) Patent No.: US 8,396,775 B1
(45) Date of Patent: Mar. 12, 2013

(54) OPTIMAL GLIDE PATH DESIGN FOR FUNDING FINANCIAL COMMITMENTS

(76) Inventor: Dimitry Mindlin, Oak Park, CA (US)

( * ) Notice: Subject to any disclaimer, the term of this patent is extended or adjusted under 35 U.S.C. 154(b) by 589 days.

(21) Appl. No.: 12/340,557

(22) Filed: Dec. 19, 2008

(51) Int. Cl.
*G06Q 40/00* (2012.01)
(52) U.S. Cl. ........................... 705/36 R; 705/35
(58) Field of Classification Search ............... 705/36, 705/35
See application file for complete search history.

(56) References Cited

U.S. PATENT DOCUMENTS

| | | | |
|---|---|---|---|
| 2005/0197857 A1* | 9/2005 | Avery ........................... | 705/1 |
| 2009/0048958 A1* | 2/2009 | Gardner et al. ................. | 705/35 |
| 2009/0094069 A1* | 4/2009 | Castille et al. ................. | 705/4 |
| 2009/0327155 A1* | 12/2009 | Dial et al. ..................... | 705/36 R |

OTHER PUBLICATIONS

Nigel, D. L. (2008). Making ends meet: Target date investment funds and retirement wealth creation. Pensions : An International Journal, 13(3), 130-135.retrieved Jan. 8, 2013.*
Sesin, K. (2008). The role of target date funds in a DC portfolio. Benefits Canada, 32(12), 58-58. Retrieved Jan. 8, 2013.*
Bernstein, P. , "Which Policy Do You Mean? ", "Economics and Portfolio Strategy", Aug. 15, 2003, pp. 1-5.
Greene, Kelly, "Some Disadvantages of Target-Date Mutual Funds ", "Wall Street Journal Online", Feb. 6, 2009, Publisher: http://online.wsj.com/article/SB123395635544258275.html?mod=todays_us_money_and_investing.
Idzorek, T. , "Lifetime Asset Allocations: Methodologies for Target Maturity Funds", "Ibbotson Associates Research Report", Apr. 20, 2007, pp. 147, Publisher: Ibbotson Corporation.
Klugman, S. et al. , "Appendix A: An Inventory of Continuous Distributions ", "Loss Models: From Data to Decisions, Second Edition", Aug. 24, 2004, p. 580, Publisher: Wiley-Interscience.
Markowitz, H. , "Portfolio Selection", "The Journal of Finance", Mar. 1952, pp. 77-91, vol. 7, No. 1, Publisher: American Finance Association.
Roy, A. D. , "Safety-First and the Holding of Assets", "Econometrica", 1952, pp. 431-449, vol. 20, No. 3.

* cited by examiner

*Primary Examiner* — Kito R Robinson
(74) *Attorney, Agent, or Firm* — Vincent K. Gustafson; Jenkins, Wilson, Taylor & Hunt, P.A.

(57) ABSTRACT

Methods are provided for allocating assets of defined benefit or defined contribution investing plans that yield the highest post-employment standard of living given a level of risk acceptable to plan participants, and that minimize saving rates and risk. The Nash equilibrium glide path representing a series of time-dependent investment portfolios including multiple asset classes is generated, taking into account demographic data for plan participants and at least one selected risk tolerance level, and utilizing computer-implemented optimization. Multiple moments of a stochastic present value of future cash flows are calculated, and a matching distribution is selected. Risk analysis of the glide path and financial commitments utilizes this matching distribution.

7 Claims, 15 Drawing Sheets

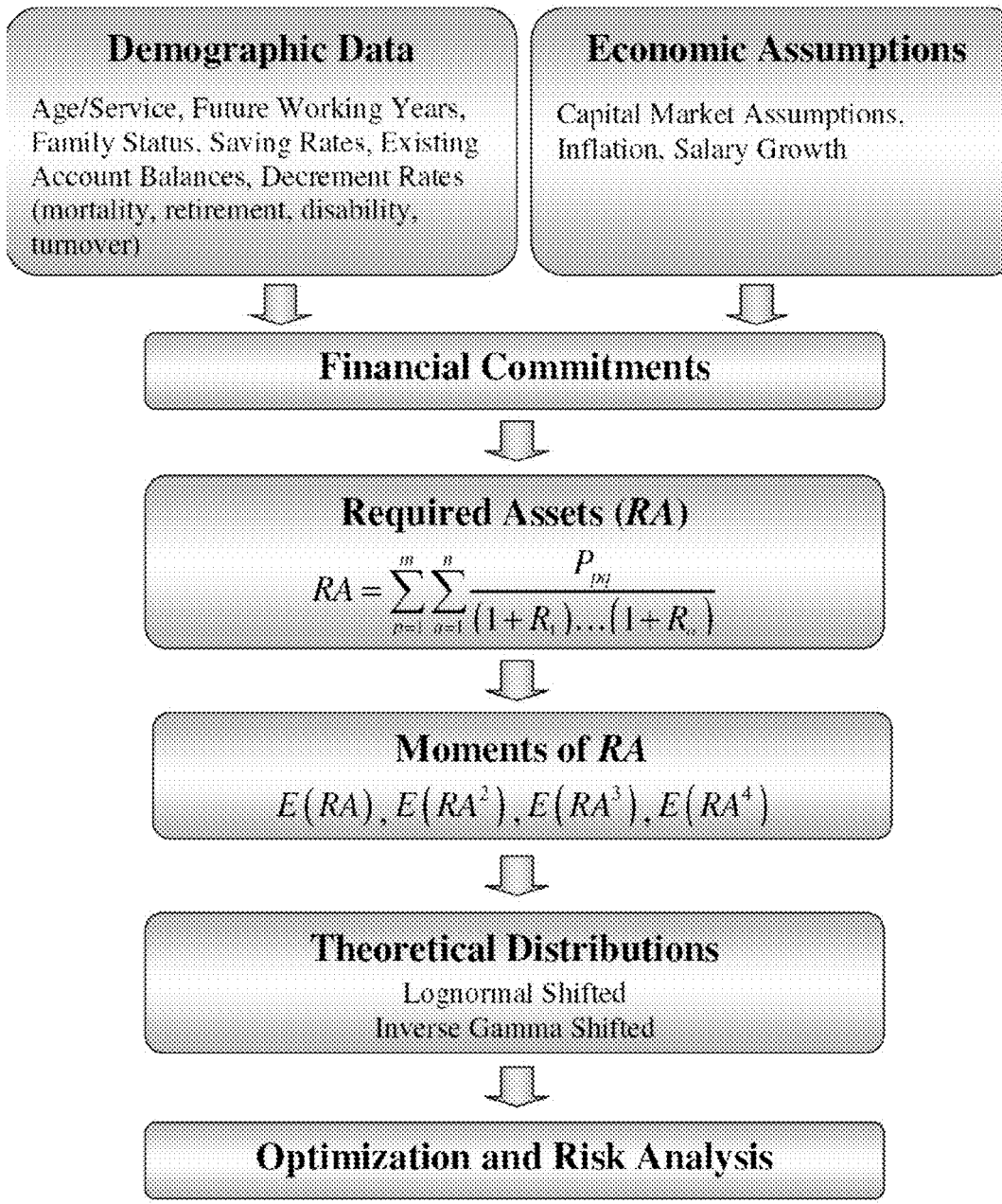
FIG_1

$\underline{N=1}$

Let's define
$A_i^{(1)} = X_i$, $1 \leq i \leq m$.
Then $$\left(\sum_{i=1}^{m} X_i\right)^1 = \sum_{i=1}^{m} A_i^{(1)} \qquad (2.5.2)$$

FIG. 2A

$\underline{N=2}$

Let's define
$A_i^{(2)} = X_i^2$, $1 \leq i \leq m$
$B_i^{(2)} = \sum_{j=1}^{i-1} X_i X_j$, $2 \leq i \leq m$, $B_1^{(2)} = 0$
Then $$\left(\sum_{i=1}^{m} X_i\right)^2 = \sum_{i=1}^{m} (A_i^{(2)} + 2B_i^{(2)}) \qquad (2.5.3)$$

FIG. 2B

$\underline{N=3}$

Let's define
$A_i^{(3)} = X_i^3$, $1 \leq i \leq m$
$B_i^{(3)} = \sum_{j=1}^{i-1} X_i X_j (X_i + X_j)$, $2 \leq i \leq m$, $B_1^{(3)} = 0$
$C_i^{(3)} = \sum_{j=1}^{i-1} \sum_{k=1}^{j-1} X_i X_j X_k$, $3 \leq i \leq m$, $C_1^{(3)} = C_2^{(3)} = 0$
Then $$\left(\sum_{i=1}^{m} X_i\right)^3 = \sum_{i=1}^{m} (A_i^{(3)} + 3B_i^{(3)} + 6C_i^{(3)}) \qquad (2.5.4)$$

FIG. 2C

$\underline{N=4}$

Let's define $A_i^{(4)} = X_i^4$, $1 \le i \le m$ $B_i^{(4)} = \sum_{j=1}^{i-1} X_i X_j \left( 2X_i^2 + 3X_i X_j + 2X_j^2 \right)$, $2 \le i \le m$, $B_1^{(4)} = 0$ $C_i^{(4)} = \sum_{j=1}^{i-1} \sum_{k=1}^{j-1} X_i X_j X_k \left( X_i + X_j + X_k \right)$, $3 \le i \le m$, $C_1^{(4)} = C_2^{(4)} = 0$ $D_i^{(4)} = \sum_{j=1}^{i-1} \sum_{k=1}^{j-1} \sum_{l=1}^{k-1} X_i X_j X_k X_l$, $\quad 4 \le i \le m$, $D_1^{(4)} = D_2^{(4)} = D_3^{(4)} = 0$ Then $$\left( \sum_{i=1}^{m} X_i \right)^4 = \sum_{i=1}^{m} (A_i^{(4)} + 2B_i^{(4)} + 12C_i^{(4)} + 24D_i^{(4)}) \qquad (2.5.5)$$

FIG._2D $$E\left( \left( \sum_{i=1}^{m} X_i \right)^1 \right) = \sum_{i=1}^{m} E\left( A_i^{(1)} \right) \qquad (2.5.6)$$

$$E\left( \left( \sum_{i=1}^{m} X_i \right)^2 \right) = \sum_{i=1}^{m} \left( E\left( A_i^{(2)} \right) + 2E\left( B_i^{(2)} \right) \right) \qquad (2.5.7)$$

$$E\left( \left( \sum_{i=1}^{m} X_i \right)^3 \right) = \sum_{i=1}^{m} \left( E\left( A_i^{(3)} \right) + 3E\left( B_i^{(3)} \right) + 6E\left( C_i^{(3)} \right) \right) \qquad (2.5.8)$$

$$E\left( \left( \sum_{i=1}^{m} X_i \right)^4 \right) = \sum_{i=1}^{m} \left( E\left( A_i^{(4)} \right) + 2E\left( B_i^{(4)} \right) + 12E\left( C_i^{(4)} \right) + 24E\left( D_i^{(4)} \right) \right) \qquad (2.5.9)$$

FIG._2E $\underline{N = 1}$ $A_p^{(1)} = X_p = V_p^{(k-1)} \cdot S_{pk}, \ 1 \le p \le m$ $E(A_p^{(1)}) = E(V_p^{(k-1)}) E(S_{pk})$  (2.5.10)

FIG._3A

$\underline{N = 2}$ $A_p^{(2)} = X_p^2 = (V_p^{(k-1)} \cdot S_{pk})^2, \ 1 \le p \le m$ $B_p^{(2)} = \sum_{q=1}^{p-1} X_p X_q = \sum_{q=1}^{p-1} V_p^{(k-1)} V_q^{(k-1)} \cdot S_{pk} S_{qk}, \ 2 \le p \le m, \ B_1^{(2)} = 0$ $E(A_p^{(2)}) = E((V_p^{(k-1)} \cdot)^2) E(S_{pk}^2)$ $E(B_p^{(2)}) = \sum_{q=1}^{p-1} E(V_p^{(k-1)} V_q^{(k-1)}) E(S_{pk} S_{qk})$  (2.5.11)

FIG._3B

$\underline{N = 3}$ $A_p^{(3)} = X_p^3 = (V_p^{(k-1)} \cdot S_{pk})^3, \ 1 \le p \le m$ $B_p^{(3)} = \sum_{q=1}^{p-1} X_p X_q (X_p + X_q) = \sum_{q=1}^{p-1} (V_p^{(k-1)})^2 V_q^{(k-1)} S_{pk}^2 S_{qk} + \sum_{q=1}^{p-1} V_p^{(k-1)} (V_q^{(k-1)})^2 S_{pk} S_{qk}^2$ $2 \le p \le m, \ B_1^{(3)} = 0$ $C_p^{(3)} = \sum_{q=1}^{p-1} \sum_{t=1}^{q-1} X_p X_q X_t = \sum_{q=1}^{p-1} \sum_{t=1}^{q-1} V_p^{(k-1)} V_q^{(k-1)} V_t^{(k-1)} S_{pk} S_{qk} S_{tk}$, $3 \le i \le m, \ C_1^{(3)} = C_2^{(3)} = 0$ $E(A_p^{(3)}) = E((V_p^{(k-1)})^3) E(S_{pk}^3)$ $E(B_p^{(3)}) = \sum_{q=1}^{p-1} E((V_p^{(k-1)})^2 V_q^{(k-1)}) E(S_{pk}^2 S_{qk}) + \sum_{q=1}^{p-1} E(V_p^{(k-1)} (V_q^{(k-1)})^2) E(S_{pk} S_{qk}^2)$ $E(C_p^{(3)}) = \sum_{q=1}^{p-1} \sum_{t=1}^{q-1} E(V_p^{(k-1)} V_q^{(k-1)} V_t^{(k-1)}) E(S_{pk} S_{qk} S_{tk})$  (2.5.12)

FIG._3C

$\underline{N=4}$ $$A_p^{(4)} = X_p^4 = \left(V_p^{(k-1)} S_{pk}\right)^4, \ 1 \le p \le m$$

$$B_p^{(4)} = \sum_{q=1}^{p-1} X_p X_q \left(2X_p^2 + 3X_p X_q + 2X_q^2\right) =$$

$$= 2\sum_{q=1}^{p-1}\left(V_p^{(k-1)}S_{pk}\right)^3 V_q^{(k-1)}S_{qk} + 3\sum_{q=1}^{p-1}\left(V_p^{(k-1)}S_{pk}\right)^2\left(V_q^{(k-1)}S_{qk}\right)^2 + 2\sum_{q=1}^{p-1} V_p^{(k-1)}S_{pk}\left(V_q^{(k-1)}S_{qk}\right)^3$$

$2 \le i \le m, \ B_1^{(4)} = 0$ $$C_p^{(4)} = \sum_{q=1}^{p-1}\sum_{t=1}^{q-1} X_p X_q X_t \left(X_p + X_q + X_t\right) = \sum_{q=1}^{p-1}\sum_{t=1}^{q-1} X_p^2 X_q X_t + \sum_{q=1}^{p-1}\sum_{t=1}^{q-1} X_p X_q^2 X_t + \sum_{q=1}^{p-1}\sum_{t=1}^{q-1} X_p X_q X_t^2 =$$

$$= \sum_{q=1}^{p-1}\sum_{t=1}^{q-1}\left(V_p^{(k-1)}S_{pk}\right)^2 V_q^{(k-1)}S_{qk}V_t^{(k-1)}S_{tk} + \sum_{q=1}^{p-1}\sum_{t=1}^{q-1} V_p^{(k-1)}S_{pk}\left(V_q^{(k-1)}S_{qk}\right)^2 V_t^{(k-1)}S_{tk} + \sum_{q=1}^{p-1}\sum_{t=1}^{q-1} V_p^{(k-1)}S_{pk}V_q^{(k-1)}S_{qk}\left(V_t^{(k-1)}S_{tk}\right)^2$$

$3 \le p \le m, \ C_1^{(4)} = C_2^{(4)} = 0$ $$D_p^{(4)} = \sum_{q=1}^{p-1}\sum_{t=1}^{q-1}\sum_{u=1}^{t-1} X_p X_q X_t X_u = \sum_{q=1}^{p-1}\sum_{t=1}^{q-1}\sum_{u=1}^{t-1} V_p^{(k-1)}S_{pk}V_q^{(k-1)}S_{qk}V_t^{(k-1)}S_{tk}V_u^{(k-1)}S_{uk}$$

$4 \le p \le m, \ D_1^{(4)} = D_2^{(4)} = D_3^{(4)} = 0$ $$E\left(A_p^{(4)}\right) = E\left(\left(V_p^{(k-1)}S_{pk}\right)^4\right) = E\left(\left(V_p^{(k-1)}\right)^4\right)E\left(S_{pk}^4\right)$$

$$E\left(B_p^{(4)}\right) = 2\sum_{q=1}^{p-1} E\left(\left(V_p^{(k-1)}\right)^3 V_q^{(k-1)}\right)E\left(S_{pk}^3 S_{qk}\right) +$$

$$+ 3\sum_{q=1}^{p-1} E\left(\left(V_p^{(k-1)}\right)^2\left(V_q^{(k-1)}\right)^2\right)E\left(S_{pk}^2 S_{qk}^2\right) +$$

$$+ 2\sum_{q=1}^{p-1} E\left(V_p^{(k-1)}\left(V_q^{(k-1)}\right)^3\right)E\left(S_{pk}S_{qk}^3\right)$$

$$E\left(C_p^{(4)}\right) = \sum_{q=1}^{p-1}\sum_{t=1}^{q-1} E\left(\left(V_p^{(k-1)}\right)^2 V_q^{(k-1)} V_t^{(k-1)}\right)E\left(S_{pk}^2 S_{qk} S_{tk}\right) +$$

$$+ \sum_{q=1}^{p-1}\sum_{t=1}^{q-1} E\left(V_p^{(k-1)}\left(V_q^{(k-1)}\right)^2 V_t^{(k-1)}\right)E\left(S_{pk}S_{qk}^2 S_{tk}\right) +$$

$$+ \sum_{q=1}^{p-1}\sum_{t=1}^{q-1} E\left(V_p^{(k-1)} V_q^{(k-1)}\left(V_t^{(k-1)}\right)^2\right)E\left(S_{pk}S_{qk}S_{tk}^2\right)$$

$$E\left(D_p^{(4)}\right) = \sum_{q=1}^{p-1}\sum_{t=1}^{q-1}\sum_{u=1}^{t-1} E\left(V_p^{(k-1)}V_q^{(k-1)}V_t^{(k-1)}V_u^{(k-1)}\right)E\left(S_{pk}S_{qk}S_{tk}S_{uk}\right) \quad (2.5.13)$$

FIG. 3D

$$E(S_{pk}) = B_{pk}E(L_{pk}\frac{V_{pk}}{R_k}) + E(\frac{V_{pk}}{R_k})E(S_{p,k+1})$$

FIG._4A

$$E(S_{pk}^2) = B_{pk}^2 E\left(\frac{V_{pk}^2}{R_k^2}L_{pk}^2\right) + 2B_{pk}E\left(\frac{V_{pk}^2}{R_k^2}L_{pk}\right)E(S_{p,k+1}) + E\left(\frac{V_{pk}^2}{R_k^2}\right)E(S_{p,k+1}^2)$$

FIG._4B

$$E(S_{pk}^3) = B_{pk}^3 E\left(\frac{V_{pk}^3}{R_k^3}L_{pk}^3\right) + 3B_{pk}^2 E\left(\frac{V_{pk}^3}{R_k^3}L_{pk}^2\right)E(S_{p,k+1}) + 3B_{pk}E\left(\frac{V_{pk}^3}{R_k^3}L_{pk}\right)E(S_{p,k+1}^2) + E\left(\frac{V_{pk}^3}{R_k^3}\right)E(S_{p,k+1}^3)$$

FIG._4C

$$E(S_{pk}^4) = B_{pk}^4 E\left(\frac{V_{pk}^4}{R_k^4}L_{pk}^4\right) + 4B_{pk}^3 E\left(\frac{V_{pk}^4}{R_k^4}L_{pk}^3\right)E(S_{p,k+1}) + 6B_{pk}^2 E\left(\frac{V_{pk}^4}{R_k^4}L_{pk}^2\right)E(S_{p,k+1}^2) +$$
$$+ 4B_{pk}E\left(\frac{V_{pk}^4}{R_k^4}L_{pk}\right)E(S_{p,k+1}^3) + E\left(\frac{V_{pk}^4}{R_k^4}\right)E(S_{p,k+1}^4)$$

FIG._4D

$$E(S_{pk}S_{qk}) = B_{pk}B_{qk}E\left(\frac{V_{pk}V_{qk}}{R_k^2}L_{pk}L_{qk}\right) + B_{pk}E\left(\frac{V_{pk}V_{qk}}{R_k^2}L_{pk}\right)E(S_{q,k+1}) +$$
$$+ B_{qk}E\left(\frac{V_{pk}V_{qk}}{R_k^2}L_{qk}\right)E(S_{p,k+1}) + E\left(\frac{V_{pk}V_{qk}}{R_k^2}\right)E(S_{p,k+1}S_{q,k+1})$$

FIG._4E

$$E\left(S_{pk}^2 S_{qk}\right) = B_{pk}^2 B_{qk} E\left(\frac{V_{pk}^2 V_{qk}}{R_k^3} L_{pk}^2 L_{qk}\right) + B_{pk}^2 E\left(\frac{V_{pk}^2 V_{qk}}{R_k^3} L_{pk}^2\right) E\left(S_{q,k+1}\right) +$$

$$+ 2B_{pk} B_{qk} E\left(\frac{V_{pk}^2 V_{qk}}{R_k^3} L_{pk} L_{qk}\right) E\left(S_{p,k+1}\right) + 2B_{pk} E\left(\frac{V_{pk}^2 V_{qk}}{R_k^3} L_{pk}\right) E\left(S_{p,k+1} S_{q,k+1}\right) +$$

$$+ B_{qk} E\left(\frac{V_{pk}^2 V_{qk}}{R_k^3} L_{qk}\right) E\left(S_{p,k+1}^2\right) + E\left(\frac{V_{pk}^2 V_{qk}}{R_k^3}\right) E\left(S_{p,k+1}^2 S_{q,k+1}\right)$$

FIG._4F

$$E\left(S_{pk} S_{qk}^2\right) = B_{pk} B_{qk}^2 E\left(\frac{V_{pk} V_{qk}^2}{R_k^3} L_{pk} L_{qk}^2\right) + B_{qk}^2 E\left(\frac{V_{pk} V_{qk}^2}{R_k^3} L_{qk}^2\right) E\left(S_{p,k+1}\right) +$$

$$+ 2B_{pk} B_{qk} E\left(\frac{V_{pk} V_{qk}^2}{R_k^3} L_{pk} L_{qk}\right) E\left(S_{q,k+1}\right) + 2B_{qk} E\left(\frac{V_{pk} V_{qk}^2}{R_k^3} L_{qk}\right) E\left(S_{p,k+1} S_{q,k+1}\right) +$$

$$+ B_{pk} E\left(\frac{V_{pk} V_{qk}^2}{R_k^3} L_{pk}\right) E\left(S_{q,k+1}^2\right) + E\left(\frac{V_{pk} V_{qk}^2}{R_k^3}\right) E\left(S_{p,k+1} S_{q,k+1}^2\right)$$

FIG._4G

$$E\left(S_{pk} S_{qk} S_{tk}\right) = B_{pk} B_{qk} B_{tk} E\left(\frac{V_{pk} V_{qk} V_{tk}}{R_k^3} L_{pk} L_{qk} L_{tk}\right) + B_{pk} B_{qk} E\left(\frac{V_{pk} V_{qk} V_{tk}}{R_k^3} L_{pk} L_{qk}\right) E\left(S_{t,k+1}\right) +$$

$$+ B_{pk} B_{tk} E\left(\frac{V_{pk} V_{qk} V_{tk}}{R_k^3} L_{pk} L_{tk}\right) E\left(S_{q,k+1}\right) + B_{pk} E\left(\frac{V_{pk} V_{qk} V_{tk}}{R_k^3} L_{pk}\right) E\left(S_{q,k+1} S_{t,k+1}\right) +$$

$$+ B_{qk} B_{tk} E\left(\frac{V_{pk} V_{qk} V_{tk}}{R_k^3} L_{qk} L_{tk}\right) E\left(S_{p,k+1}\right) + B_{qk} E\left(\frac{V_{pk} V_{qk} V_{tk}}{R_k^3} L_{qk}\right) E\left(S_{p,k+1} S_{t,k+1}\right) +$$

$$+ B_{tk} E\left(\frac{V_{pk} V_{qk} V_{tk}}{R_k^3} L_{tk}\right) E\left(S_{p,k+1} S_{q,k+1}\right) + E\left(\frac{V_{pk} V_{qk} V_{tk}}{R_k^3}\right) E\left(S_{p,k+1} S_{q,k+1} S_{t,k+1}\right)$$

FIG._4H

$$E(S_{pk}^3 S_{qk}) = B_{pk}^3 B_{qk} E\left(\frac{V_{pk}^3 V_{qk}}{R_k^4} L_{pk}^3 L_{qk}\right) + B_{pk}^3 E\left(\frac{V_{pk}^3 V_{qk}}{R_k^4} L_{pk}^3\right) E(S_{q,k+1}) + 3 B_{pk}^2 B_{qk} E\left(\frac{V_{pk}^3 V_{qk}}{R_k^4} L_{pk}^2 L_{qk}\right) E(S_{p,k+1}) +$$

$$+ 3 B_{pk}^2 E\left(\frac{V_{pk}^3 V_{qk}}{R_k^4} L_{pk}^2\right) E(S_{p,k+1} S_{q,k+1}) + 3 B_{pk} B_{qk} E\left(\frac{V_{pk}^3 V_{qk}}{R_k^4} L_{pk} L_{qk}\right) E(S_{p,k+1}^2) + 3 B_{pk} E\left(\frac{V_{pk}^3 V_{qk}}{R_k^4} L_{pk}\right) E(S_{p,k+1}^2 S_{q,k+1}) +$$

$$+ B_{qk} E\left(\frac{V_{pk}^3 V_{qk}}{R_k^4} L_{qk}\right) E(S_{p,k+1}^3) + E\left(\frac{V_{pk}^3 V_{qk}}{R_k^4}\right) E(S_{p,k+1}^3 S_{q,k+1})$$

FIG. 4I

$$E(S_{pk} S_{qk}^3) = B_{pk} B_{qk}^3 E\left(\frac{V_{pk} V_{qk}^3}{R_k^4} L_{pk} L_{qk}^3\right) + B_{qk}^3 E\left(\frac{V_{pk} V_{qk}^3}{R_k^4} L_{qk}^3\right) E(S_{p,k+1}) + 3 B_{pk} B_{qk}^2 E\left(\frac{V_{pk} V_{qk}^3}{R_k^4} L_{pk} L_{qk}^2\right) E(S_{q,k+1}) +$$

$$+ 3 B_{qk}^2 E\left(\frac{V_{pk} V_{qk}^3}{R_k^4} L_{qk}^2\right) E(S_{p,k+1} S_{q,k+1}) + 3 B_{pk} B_{qk} E\left(\frac{V_{pk} V_{qk}^3}{R_k^4} L_{pk} L_{qk}\right) E(S_{q,k+1}^2) + 3 B_{qk} E\left(\frac{V_{pk} V_{qk}^3}{R_k^4} L_{qk}\right) E(S_{p,k+1} S_{q,k+1}^2) +$$

$$+ B_{pk} E\left(\frac{V_{pk} V_{qk}^3}{R_k^4} L_{pk}\right) E(S_{q,k+1}^3) + E\left(\frac{V_{pk} V_{qk}^3}{R_k^4}\right) E(S_{p,k+1} S_{q,k+1}^3)$$

FIG. 4J

$$E(S_{pk}^2 S_{qk}^2) = B_{pk}^2 B_{qk}^2 E\left(\frac{V_{pk}^2 V_{qk}^2}{R_k^4} L_{pk}^2 L_{qk}^2\right) + 2 B_{pk} B_{qk}^2 E\left(\frac{V_{pk}^2 V_{qk}^2}{R_k^4} L_{pk} L_{qk}^2\right) E(S_{p,k+1}) + B_{qk}^2 E\left(\frac{V_{pk}^2 V_{qk}^2}{R_k^4} L_{qk}^2\right) E(S_{p,k+1}^2) +$$

$$+ 2 B_{pk}^2 B_{qk} E\left(\frac{V_{pk}^2 V_{qk}^2}{R_k^4} L_{pk}^2 L_{qk}\right) E(S_{q,k+1}) + 4 B_{pk} B_{qk} E\left(\frac{V_{pk}^2 V_{qk}^2}{R_k^4} L_{pk} L_{qk}\right) E(S_{p,k+1} S_{q,k+1}) +$$

$$+ 2 B_{qk} E\left(\frac{V_{pk}^2 V_{qk}^2}{R_k^4} L_{qk}\right) E(S_{p,k+1}^2 S_{q,k+1}) + B_{pk}^2 E\left(\frac{V_{pk}^2 V_{qk}^2}{R_k^4} L_{pk}^2\right) E(S_{q,k+1}^2) +$$

$$+ 2 B_{pk} E\left(\frac{V_{pk}^2 V_{qk}^2}{R_k^4} L_{pk}\right) E(S_{p,k+1} S_{q,k+1}^2) + E\left(\frac{V_{pk}^2 V_{qk}^2}{R_k^4}\right) E(S_{p,k+1}^2 S_{q,k+1}^2)$$

FIG. 4K

$$E\left(S_{pk}^2 S_{qk} S_{tk}\right) = B_{pk}^2 B_{qk} B_{tk} E\left(\frac{V_{pk}^2 V_{qk} V_{tk}}{R_k^4} L_{pk}^2 L_{qk} L_{tk}\right) + 2 B_{pk} B_{qk} B_{tk} E\left(\frac{V_{pk}^2 V_{qk} V_{tk}}{R_k^4} L_{pk} L_{qk} L_{tk}\right) E\left(S_{p,k+1}\right) +$$

$$+ B_{qk} B_{tk} E\left(\frac{V_{pk}^2 V_{qk} V_{tk}}{R_k^4} L_{qk} L_{tk}\right) E\left(S_{p,k+1}^2\right) + B_{pk}^2 B_{tk} E\left(\frac{V_{pk}^2 V_{qk} V_{tk}}{R_k^4} L_{pk}^2 L_{tk}\right) E\left(S_{q,k+1}\right) +$$

$$+ 2 B_{pk} B_{tk} E\left(\frac{V_{pk}^2 V_{qk} V_{tk}}{R_k^4} L_{pk} L_{tk}\right) E\left(S_{p,k+1} S_{q,k+1}\right) + B_{tk} E\left(\frac{V_{pk}^2 V_{qk} V_{tk}}{R_k^4} L_{tk}\right) E\left(S_{p,k+1}^2 S_{q,k+1}\right) +$$

$$+ B_{pk}^2 B_{qk} E\left(\frac{V_{pk}^2 V_{qk} V_{tk}}{R_k^4} L_{pk}^2 L_{qk}\right) E\left(S_{t,k+1}\right) + 2 B_{pk} B_{qk} E\left(\frac{V_{pk}^2 V_{qk} V_{tk}}{R_k^4} L_{pk} L_{qk}\right) E\left(S_{p,k+1} S_{t,k+1}\right) +$$

$$+ B_{qk} E\left(\frac{V_{pk}^2 V_{qk} V_{tk}}{R_k^4} L_{qk}\right) E\left(S_{p,k+1}^2 S_{t,k+1}\right) + B_{pk}^2 E\left(\frac{V_{pk}^2 V_{qk} V_{tk}}{R_k^4} L_{pk}^2\right) E\left(S_{q,k+1} S_{t,k+1}\right) +$$

$$+ 2 B_{pk} E\left(\frac{V_{pk}^2 V_{qk} V_{tk}}{R_k^4} L_{pk}\right) E\left(S_{p,k+1} S_{q,k+1} S_{t,k+1}\right) + E\left(\frac{V_{pk}^2 V_{qk} V_{tk}}{R_k^4}\right) E\left(S_{p,k+1}^2 S_{q,k+1} S_{t,k+1}\right)$$

FIG. 4L

$$E\left(S_{pk} S_{qk}^2 S_{tk}\right) = B_{pk} B_{qk}^2 B_{tk} E\left(\frac{V_{pk} V_{qk}^2 V_{tk}}{R_k^4} L_{pk} L_{qk}^2 L_{tk}\right) + 2 B_{pk} B_{qk} B_{tk} E\left(\frac{V_{pk} V_{qk}^2 V_{tk}}{R_k^4} L_{pk} L_{qk} L_{tk}\right) E\left(S_{q,k+1}\right) +$$

$$+ B_{pk} B_{tk} E\left(\frac{V_{pk} V_{qk}^2 V_{tk}}{R_k^4} L_{pk} L_{tk}\right) E\left(S_{q,k+1}^2\right) + B_{qk}^2 B_{tk} E\left(\frac{V_{pk} V_{qk}^2 V_{tk}}{R_k^4} L_{qk}^2 L_{tk}\right) E\left(S_{p,k+1}\right) +$$

$$+ 2 B_{qk} B_{tk} E\left(\frac{V_{pk} V_{qk}^2 V_{tk}}{R_k^4} L_{qk} L_{tk}\right) E\left(S_{p,k+1} S_{q,k+1}\right) + B_{tk} E\left(\frac{V_{pk} V_{qk}^2 V_{tk}}{R_k^4} L_{tk}\right) E\left(S_{p,k+1} S_{q,k+1}^2\right) +$$

$$+ B_{pk} B_{qk}^2 E\left(\frac{V_{pk} V_{qk}^2 V_{tk}}{R_k^4} L_{pk} L_{qk}^2\right) E\left(S_{t,k+1}\right) + 2 B_{pk} B_{qk} E\left(\frac{V_{pk} V_{qk}^2 V_{tk}}{R_k^4} L_{pk} L_{qk}\right) E\left(S_{q,k+1} S_{t,k+1}\right) +$$

$$+ B_{pk} E\left(\frac{V_{pk} V_{qk}^2 V_{tk}}{R_k^4} L_{pk}\right) E\left(S_{q,k+1}^2 S_{t,k+1}\right) + B_{qk}^2 E\left(\frac{V_{pk} V_{qk}^2 V_{tk}}{R_k^4} L_{qk}^2\right) E\left(S_{p,k+1} S_{t,k+1}\right) +$$

$$+ 2 B_{qk} E\left(\frac{V_{pk} V_{qk}^2 V_{tk}}{R_k^4} L_{qk}\right) E\left(S_{p,k+1} S_{q,k+1} S_{t,k+1}\right) + E\left(S_{p,k+1} S_{q,k+1}^2 S_{t,k+1}\right) E\left(\frac{V_{pk} V_{qk}^2 V_{tk}}{R_k^4}\right)$$

FIG. 4M

$$E\left(S_{pk}S_{qk}S_{tk}^2\right) = B_{pk}B_{qk}B_{tk}^2 E\left(\frac{V_{pk}V_{qk}V_{tk}^2}{R_k^4}L_{pk}L_{qk}L_{tk}^2\right) + 2B_{pk}B_{qk}B_{tk} E\left(\frac{V_{pk}V_{qk}V_{tk}^2}{R_k^4}L_{pk}L_{qk}L_{tk}\right)E\left(S_{t,k+1}\right) +$$

$$+ B_{pk}B_{qk}E\left(\frac{V_{pk}V_{qk}V_{tk}^2}{R_k^4}L_{pk}L_{qk}\right)E\left(S_{t,k+1}^2\right) + B_{qk}B_{tk}^2 E\left(\frac{V_{pk}V_{qk}V_{tk}^2}{R_k^4}L_{qk}L_{tk}^2\right)E\left(S_{p,k+1}\right) +$$

$$+ 2B_{qk}B_{tk}E\left(\frac{V_{pk}V_{qk}V_{tk}^2}{R_k^4}L_{qk}L_{tk}\right)E\left(S_{p,k+1}S_{t,k+1}\right) + B_{qk}E\left(\frac{V_{pk}V_{qk}V_{tk}^2}{R_k^4}L_{qk}\right)E\left(S_{p,k+1}S_{t,k+1}^2\right) +$$

$$+ B_{pk}B_{tk}^2 E\left(\frac{V_{pk}V_{qk}V_{tk}^2}{R_k^4}L_{pk}L_{tk}^2\right)E\left(S_{q,k+1}\right) + 2B_{pk}B_{tk}E\left(\frac{V_{pk}V_{qk}V_{tk}^2}{R_k^4}L_{pk}L_{tk}\right)E\left(S_{q,k+1}S_{t,k+1}\right) +$$

$$B_{pk}E\left(\frac{V_{pk}V_{qk}V_{tk}^2}{R_k^4}L_{pk}\right)E\left(S_{q,k+1}S_{t,k+1}^2\right) + B_{tk}^2 E\left(\frac{V_{pk}V_{qk}V_{tk}^2}{R_k^4}L_{tk}^2\right)E\left(S_{p,k+1}S_{q,k+1}\right) +$$

$$+ 2B_{tk}E\left(\frac{V_{pk}V_{qk}V_{tk}^2}{R_k^4}L_{tk}\right)E\left(S_{p,k+1}S_{q,k+1}S_{t,k+1}\right) + E\left(\frac{V_{pk}V_{qk}V_{tk}^2}{R_k^4}\right)E\left(S_{p,k+1}S_{q,k+1}S_{t,k+1}^2\right)$$

FIG._4N $$E\left(S_{pk}S_{qk}S_{tk}S_{uk}\right) = B_{pk}B_{qk}B_{tk}B_{uk} E\left(\frac{V_{pk}V_{qk}V_{tk}V_{uk}}{R_k^4}L_{pk}L_{qk}L_{tk}L_{uk}\right) +$$

$$+ B_{qk}B_{tk}B_{uk} E\left(\frac{V_{pk}V_{qk}V_{tk}V_{uk}}{R_k^4}L_{qk}L_{tk}L_{uk}\right)E\left(S_{p,k+1}\right) + B_{pk}B_{tk}B_{uk} E\left(\frac{V_{pk}V_{qk}V_{tk}V_{uk}}{R_k^4}L_{pk}L_{tk}L_{uk}\right)E\left(S_{q,k+1}\right) +$$

$$+ B_{pk}B_{qk}B_{uk} E\left(\frac{V_{pk}V_{qk}V_{tk}V_{uk}}{R_k^4}L_{pk}L_{qk}L_{uk}\right)E\left(S_{t,k+1}\right) + B_{pk}B_{qk}B_{tk} E\left(\frac{V_{pk}V_{qk}V_{tk}V_{uk}}{R_k^4}L_{pk}L_{qk}L_{tk}\right)E\left(S_{u,k+1}\right) +$$

$$+ B_{tk}B_{uk} E\left(\frac{V_{pk}V_{qk}V_{tk}V_{uk}}{R_k^4}L_{tk}L_{uk}\right)E\left(S_{p,k+1}S_{q,k+1}\right) + B_{qk}B_{uk} E\left(\frac{V_{pk}V_{qk}V_{tk}V_{uk}}{R_k^4}L_{qk}L_{uk}\right)E\left(S_{p,k+1}S_{t,k+1}\right) +$$

$$+ B_{qk}B_{tk} E\left(\frac{V_{pk}V_{qk}V_{tk}V_{uk}}{R_k^4}L_{qk}L_{tk}\right)E\left(S_{p,k+1}S_{u,k+1}\right) + B_{pk}B_{uk} E\left(\frac{V_{pk}V_{qk}V_{tk}V_{uk}}{R_k^4}L_{pk}L_{uk}\right)E\left(S_{q,k+1}S_{t,k+1}\right) +$$

$$+ B_{pk}B_{tk} E\left(\frac{V_{pk}V_{qk}V_{tk}V_{uk}}{R_k^4}L_{pk}L_{tk}\right)E\left(S_{q,k+1}S_{u,k+1}\right) + B_{pk}B_{qk} E\left(\frac{V_{pk}V_{qk}V_{tk}V_{uk}}{R_k^4}L_{pk}L_{qk}\right)E\left(S_{t,k+1}S_{u,k+1}\right) +$$

$$+ B_{pk} E\left(\frac{V_{pk}V_{qk}V_{tk}V_{uk}}{R_k^4}L_{pk}\right)E\left(S_{q,k+1}S_{t,k+1}S_{u,k+1}\right) + B_{qk} E\left(\frac{V_{pk}V_{qk}V_{tk}V_{uk}}{R_k^4}L_{qk}\right)E\left(S_{p,k+1}S_{t,k+1}S_{u,k+1}\right) +$$

$$+ B_{tk} E\left(\frac{V_{pk}V_{qk}V_{tk}V_{uk}}{R_k^4}L_{tk}\right)E\left(S_{p,k+1}S_{q,k+1}S_{u,k+1}\right) + B_{uk} E\left(\frac{V_{pk}V_{qk}V_{tk}V_{uk}}{R_k^4}L_{uk}\right)E\left(S_{p,k+1}S_{q,k+1}S_{t,k+1}\right) +$$

$$+ E\left(\frac{V_{pk}V_{qk}V_{tk}V_{uk}}{R_k^4}\right)E\left(S_{p,k+1}S_{q,k+1}S_{t,k+1}S_{u,k+1}\right)$$

FIG._4O

Capital Market Assumptions
Return / Standard Deviation

|  | Geometric Return | St. Dev. | Arithmetic Return |
|---|---|---|---|
| Dom Equities | 8.00% | 16.00% | 9.15% |
| Int Equities | 7.75% | 18.00% | 9.20% |
| Fixed Income | 5.00% | 5.00% | 5.12% |
| Cash | 3.25% | 1.00% | 3.25% |
| TIPS | 4.50% | 6.00% | 4.67% |
| Real Estate | 5.75% | 13.00% | 6.53% |

Correlation Matrix

|  | Dom Equities | Int Equities | Fixed Income | Cash | TIPS | Real Estate |
|---|---|---|---|---|---|---|
| Dom Equities | 1 | 0.7 | 0.2 | -0.1 | -0.1 | 0.4 |
| Int Equities | 0.7 | 1 | 0.1 | -0.1 | 0 | 0.3 |
| Fixed Income | 0.2 | 0.1 | 1 | 0.1 | 0.2 | 0.2 |
| Cash | -0.1 | -0.1 | 0.1 | 1 | 0.2 | -0.1 |
| TIPS | -0.1 | 0 | 0.2 | 0.2 | 1 | 0.1 |
| Real Estate | 0.4 | 0.3 | 0.2 | -0.1 | 0.1 | 1 |

Replacement Ratio Percentiles (safety 70%)

| 10th %tile | 20th %tile | 25th %tile | 30th %tile | 50th %tile | 75th %tile | 95th %tile |
|---|---|---|---|---|---|---|
| 24.4% | 29.1% | 31.2% | 33.1% | 41.2% | 54.9% | 85.2% |

Replacement Ratio Percentiles (safety 80%)

| 10th %tile | 20th %tile | 25th %tile | 30th %tile | 50th %tile | 75th %tile | 95th %tile |
|---|---|---|---|---|---|---|
| 23.9% | 27.3% | 28.7% | 30.0% | 35.3% | 43.6% | 60.1% |

Replacement Ratio Percentiles (safety 90%)

| 10th %tile | 20th %tile | 25th %tile | 30th %tile | 50th %tile | 75th %tile | 95th %tile |
|---|---|---|---|---|---|---|
| 17.7% | 20.6% | 22.4% | 26.0% | 30.8% | 36.6% | 47.4% |

FIG._8B

OPTIMAL GLIDE PATH DESIGN FOR FUNDING FINANCIAL COMMITMENTS

FIELD OF THE INVENTION

The present invention relates to asset allocation methods, as may be applied to defined benefit and defined contribution investment plans.

BACKGROUND OF THE INVENTION

Retirement systems all around the world are going through the process of transition, as these systems strive to adjust to the challenges of decreasing ratios of workers to retirees. Governing bodies attempt to support responsible behavior via implementing regulations that encourage savings and investments.

In the U.S., the Pension Protection Act of 2006 (PPA) has been one of the most notable steps in this direction. In the defined benefit (DB) plans area, PPA modified and simplified a number of regulations including the rules for calculating minimum required and maximum tax-deductible contributions. The classic actuarial approach of calculating present values using the expected portfolio return is no longer required. The regulations contain no suggestions regarding the optimal level of contributions that would represent a sensible compromise between several competing objectives (lower cost, higher safety of benefits, stability and predictability of contributions). A comprehensive risk management framework that includes asset allocation, contribution and benefit design policies and attempts to maximize the safety of the promised benefits and minimize the cost of providing these benefits has not been developed.

With respect to the defined contribution (DC) plans, PPA encourages reasonable auto-enrolment policies and provides safe harbor protection to several investment vehicles (Qualified Default Investment Alternatives, or QDIAs). Target date funds and similar funds—the ones that adjust their portfolios as the target date approaches—are representatives of these QDIAs. As a result, the popularity and utilization of target date funds has significantly increased and should increase even more in the future.

Yet, target date funds have significant problems. By design, age and time until retirement are the only decision factors in the selection of these funds. As a result, a 50-year-old CEO and a 50-year-old janitor that plan to retire in 15 years have the same asset allocation despite the enormous differences in risk tolerance, current balances, and future earnings these individuals may have. The need to customize target date funds to specific groups is greater than ever.

Moreover, the economic theory for the design of target date funds is still in its infancy. The central feature of a target date fund is its "glide path"—a series of portfolios that evolve from more aggressive for younger investors to more conservative for older ones. While there are a number of providers of target date funds, a common principles based unified approach appears to be nonexistent at this point. Ibbotson Associates, one of the largest independent providers of investment advisory services, has stated the following recently:

"Although competing firms race to release target maturity solutions, most target maturity equity glide paths lack theoretical substance . . . . Little rigorous work has been done to answer how and why the equity-bond glide path should evolve throughout an investor's lifetime, and even less work has been done to answer how and why intra-stock and intra-bond splits should evolve over time."

Source: Lifetime Asset Allocations: Methodologies for Target Maturity Funds, Ibbotson Associates Research Report, February, 2008, Ibbotson Associates, Inc.

The existing approaches cannot justify even the most basic folk wisdom that people should be more risk tolerant when young and less so when older, reducing their exposure to risky assets. The theoretical models currently used in the industry, while complicated, nevertheless appear to be based on overly simplistic assumptions that do not take fully into account some of the most important factors that significantly affect the solutions.

The optimization and simulation models utilized by various providers of asset allocation services are usually expensive, inflexible, and intuitively unclear. Moreover, in most cases, the underlying theory behind the glide path construction in these systems, if exists, is not disclosed. While the people who manage retirement programs have a fiduciary responsibility to understand how retirement assets are and will be invested, the information available to them does not appear to be sufficient to discharge this responsibility prudently.

Overall, there is a significant gap between the needs of the practitioners in the industry and the risk management tools available to them. It would be desirable to maximize post-employment income, minimize risk to this income, and minimize saving rates needed to achieve this income. It would be further desirable to provide methods for efficient portfolio selection, for designing contribution policies, and selecting feasible financial commitment. To date, the foregoing needs have been unmet.

SUMMARY OF THE INVENTION

In one aspect, the invention relates to method for allocating assets of at least one participant of an investing plan, the method including the steps of: selecting a number of glide periods, with each glide period representing a future time period corresponding to a different investment portfolio; selecting a desired risk tolerance measurement type; determining a risk path representing at least one risk tolerance level assigned to the number of glide periods, wherein each glide period has an associated risk tolerance level; calculating at least one risk measurement for the selected risk tolerance measurement type for each glide period of the number of glide periods; generating a glide path representing the Nash equilibrium solution for funding a future financial commitment, by performing computer-implemented optimizations for the number of glide periods using the at least one risk tolerance level, wherein the glide path represents a series of time-dependent investment portfolios each subject to inclusion of multiple asset classes, with each investment portfolio corresponding to a glide period, and with each investment portfolio being subject to different percentages of different asset classes; and generating any of (A) a user-perceptible summary of the glide path; (B) a visual depiction of the glide path; and (C) a machine-readable summary of the glide path.

In another aspect, the invention relates to a method for allocating assets of at least one participant of an investing plan, the method comprising: eliciting or providing demographic data corresponding to the at least one participant; selecting a risk path representing a series of risk tolerance measurements specifying a desired level of risk in future investing periods; generating a glide path by performing optimizations in each glide period using at least one risk tolerance measurement of the series of risk tolerance measurements, wherein the glide path represents a series of time-dependent investment portfolios each subject to inclusion of multiple asset classes; performing a risk analysis of the glide path and a financial commitment, with the financial commitment representing a future cash flow obtainable by allocating assets according to the guide path; and generating any of (A) a user-perceptible summary of the glide path; (B) a visual depiction of the glide path; and (C) a machine-readable summary of the glide path.

In a further aspect, the invention relates to a method for allocating assets of at least one participant of an investing plan, the method comprising: eliciting or providing demographic data corresponding to the at least one participant; calculating required assets to fund a future financial need or goal of the at least one participant, wherein the required assets represents a stochastic present value of future cash flows; calculating moments of the required assets; selecting a known distribution whose moments match the calculated moments of the required assets, wherein the selected distribution may be deemed a matching distribution; generating a glide path representing a series of time-dependent investment portfolios each subject to inclusion of multiple asset classes; performing a risk analysis of the glide path and a financial commitment utilizing the matching distribution, with the financial commitment representing future cash flows; and generating any of (A) a user-perceptible summary of the glide path; (B) a visual depiction of the glide path; and (C) a machine-readable summary of the glide path Another aspect of the invention relates to a computer hardware and software system adapted to perform any one of the foregoing methods.

In a further aspect of the invention, any of the foregoing aspects may be combined for additional advantage.

Other aspects, features and embodiments of the invention will be more fully apparent from the ensuing disclosure and appended claims.

BRIEF DESCRIPTION OF THE DRAWINGS

FIG. 1 is a flowchart reflecting inputs and steps to be performed in implementing a method according to one embodiment of the present invention.

FIGS. 2A-2D provide equations (i.e., equation numbers (2.5.2), (2.5.3), (2.5.4), and (2.5.5), respectively) as utilized in Proposition 2.5.1 described herein and useful in practicing at least one step of a method according to the present invention.

FIG. 2E provides equations (2.5.6), (2.5.7), (2.5.8), and (2.5.9) as utilized in Corollary 2.5.2 described herein and useful in practicing at least one step of a method according to the present invention.

FIGS. 3A-3D provide equations (i.e., equation numbers (2.5.10), {2.5.11}, (2.5.12), and (2.5.13), respectively), as utilized in Proposition 2.5.3 described herein and useful in practicing at least one step of a method according to the present invention.

FIGS. 4A-4O provide equations utilized in Proposition 2.5.5 described herein and useful in practicing at least one step of a method according to the present invention.

FIG. 5 is a table including long-term capital market assumptions utilized in an example of implementation of a method according to the present invention.

DETAILED DESCRIPTION OF THE INVENTION, AND PREFERRED EMBODIMENTS THEREOF

Figure 6:
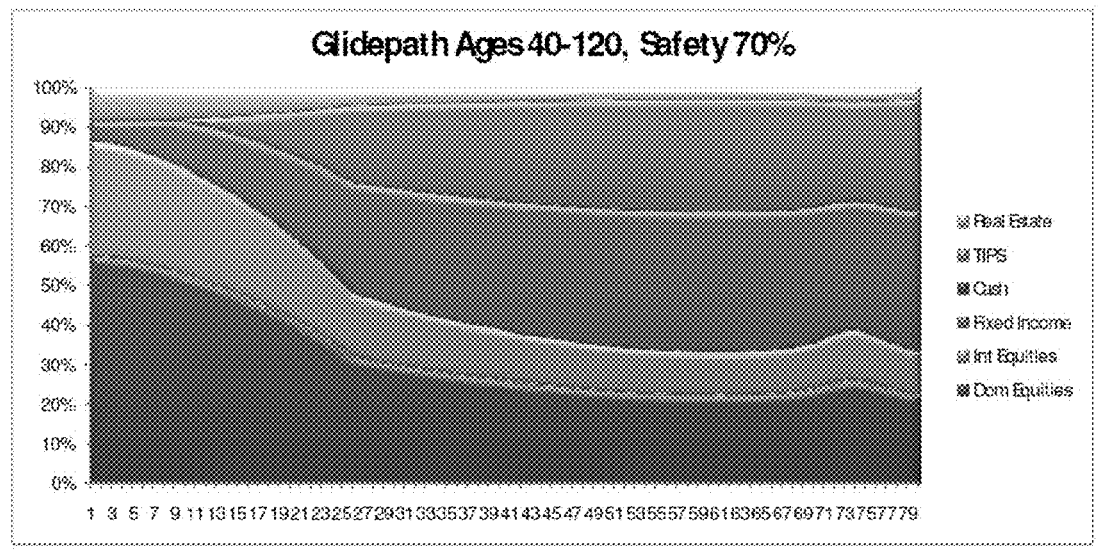
FIG. 6A is an area chart providing a graphical representation of a glide path generated in an example utilizing a method according to the present invention, with the glide path including portfolio allocations for a plan participant between ages 40-120 at a risk tolerance level ("safety") of 70%.
FIG. 6B is a table including a distribution of replacement ratio percentiles corresponding to the exemplary implementation embodied in FIG. 6A.

Disclosed herein is a new approach for managing investment programs, particularly retirement programs. The approach—which may be called Commitment Driven Investing (CDI)—may be applied to both defined benefit (DB) and defined contribution (DC) plans. The approach seamlessly integrates a new process of efficient portfolio selection, the design of the contribution policies, and the selection of a feasible financial commitment. The glide paths producible by the process maximize post-employment income, minimize risk to this income (i.e., according to a risk profile acceptable to the plan participant(s)), and minimize saving rates needed to achieve this income.

Embodiments of the present invention preferably utilize the following inputs: age/service and other demographic characteristics of the plan participants (e.g. marital status); population decrements commonly used by actuaries (mortality, disability, retirement, and turnover rates); and capital market assumptions that include return, risk, and correlations between all assets under consideration.

Performance of methods according to the present invention practically requires use of a computer-implemented optimizer. Examples of commercially available optimizers that operate on a conventional personal computer and may be used with methods according to the present invention include (A) Solver, an integral part of Microsoft Excel (Microsoft Corp., Redmond, Wash.), or (B) Premium Solver (Frontline Systems, Inc., Incline Village, Nev.). By use of such an optimizer, mathematical problems identified herein can be efficiently solved on a conventional personal computer.

A computer hardware and software system arranged to perform at least one method according to the present invention preferably includes an input device (e.g., keyboard, scanner, mouse, etc.), a memory arranged to store computer-implementable instructions, a processor, and at least one output device (e.g., a display device, a printer, an audio device, a memory device and/or removable data storage device). Network communication elements may be further provided to enable various method steps to be performed at remotely located stations, with the results of such method steps being combinable to yield a desired output.

Performance of methods describe provide a comprehensive saving and investment program from the present through the lifespan of one or more existing plan participants. A critical benefit of methods described herein is that the resulting glide path represents the Nash equilibrium solution for the funding problem, as it produces the highest post-employment standard of living given a level of risk acceptable to plan participants.

Section 1. Description of Economic Foundation 1.1 Financial Commitments

In a world full of uncertainties and anxieties, individuals and institutions make commitments at the present to accumulate certain assets in the future. Participants of defined contribution (DC) plans strive to achieve secure retirements in the future; defined benefit (DB) pension plans promise to make future benefit payments to plan participants; foundations and endowments pledge support to their causes and beneficiaries in the future. These are examples of financial commitments made at the present to have readily available assets in the future.

Throughout this disclosure, the term "financial commitment" (or just a "commitment" for brevity) is defined as a future cash flow—a series of payments at different points in the future. To fund a commitment means to make the money available when it is time to make a promised payment.

Generally, it is a challenge to guarantee at the present that an investor's financial commitment will be funded. To do so, the investor must purchase "the matching asset" for the investor's commitment—an asset that will certainly deliver the money "to pay for the groceries when the time comes." (Bernstein, P. [2005], Capital Ideas, Free Press, 2005.) Ordinarily, the matching asset—a portfolio of tradable securities that match the commitment in terms of timing, magnitude, and likelihood—rarely exists. And even if it does exist, the investor may have compelling reasons not to invest in it (the asset may be too expensive, for instance). As a result, the majority of investors—individuals and institutions—endeavor to fund their financial commitments by virtue of investing in non-matching assets.

These non-matching assets may have the capability to deliver the money when it is due, but make no firm promise to do so. Non-matching assets are always risky in this context, as the resources the investor is willing to contribute to fund the investor's commitment may turn out to be insufficient. For better or worse, investors in risky assets have to do without absolute guarantees of the results of their investment programs. (Occasionally, the terms "risky" and "non-matching" are used interchangeably in this disclosure. It should be emphasized that both "risky" and "risk-free" assets are defined as related to a particular financial commitment. As an example, a zero-coupon Treasury bond that pays $100 in ten years is a risky asset in the "asset-only" space. However, as far as the commitment is to pay $100 in ten years is concerned, this bond is the risk-free asset.)

This application presents a framework for the providing optimal solutions to the problem of funding financial commitments ("the funding problem") for investors in risky assets. The commitment, the cost of its funding, the riskiness of asset allocation, and other risks embedded in the funding problem are the key elements of this framework.

It must be emphasized that the concept of commitment plays a special role in the framework. Investors do not invest in a vacuum—they contribute their resources and take a multitude of risks mainly to fund their financial commitments. A commitment is the reason a particular investment program exists in the first place. The objective of funding the commitment should be the driving force behind the asset allocation and contribution policies as well the guiding light for risk taking. To highlight the role the concept of commitment plays in the funding problem, the framework is called Commitment Driven Investing (CDI).

CDI methodology and analytical tools are applicable to any entity that has financial commitments to fund. In particular, they are applicable to DC and DB plans, foundations and endowments. Provided below is an introduction to the general principles of CDI, followed by applications of CDI to DC plans, DB plans, foundations and endowments.

1.2. From a Line to a Triangle

Historically, institutional and individual investors have managed the riskiness of their investment programs primarily via the risk/return analysis of their portfolios. Portfolio construction has been the front and center of the investor's attention, and portfolio optimization methodologies have been largely confined to the "asset-only" space.

There are two major components of the portfolio optimization problem: return and risk. Consequently, the problem is essentially two-dimensional. (Note that there have been attempts to incorporate accounting liabilities for DB plans and quasi-liabilities for individuals into portfolio optimization process. Conceptually, however, these attempts have not done much more than the traditional approach. In particular, the problem is still two-dimensional (surplus return vs. surplus risk). So far, these approaches neither have become broadly accepted among investors nor have demonstrated their usefulness.)

The presence of a financial commitment changes this picture dramatically. The commitment itself represents a new component. The return considerations become a subset of more encompassing cost considerations. The concept of risk obviously remains, but becomes much more complex. As a result, the funding problem involves three components: commitment, cost, and risk, which form the funding triangle. The problem is essentially three-dimensional.

All three components of the funding triangle and the relationships between them are indispensable for finding optimal solutions to the funding problem. In particular, there is no risk management without cost analysis; there is no cost management without risk analysis. The commitment must be feasible given the resources the investor is willing to contribute and the risk the investor is willing to take. The cost must be reasonable given the commitment and the risk budget. The risk must be tolerable given the commitment and the cost structure. Clearly, there are fundamental relationships between all three components of the funding triangle. As a result, the stakeholders of a financial commitment have to manage all three components at the same time.

One of the most important parts of the funding problem—asset allocation—may appear to be hidden in this picture, but only seemingly so. Asset allocation plays a major role in the management of cost and risk. Asset allocation is one of the most important means in the optimization of the funding triangle. Asset allocation is in fact the main subject of this disclosure.

Throughout this disclosure, an asset allocation solution to the funding problem has a generic name "policy portfolio". A policy portfolio is either a portfolio—a set of "weights" assigned to every asset class under consideration—and a rebalancing rule, or a series of different portfolios at different points in time. For example, a policy portfolio for a DB plan may constitute a portfolio and a rule to rebalance the plan's assets to the portfolio's weights on a regular basis. As another example, a target date fund may have a "glide path" of portfolios—a series of portfolios that change their structure over time.

Before optimization objectives are specified for the funding triangle, it is informative to look at the optimization objectives in the two-dimensional "Risk/Return" framework. In this framework, the objective of portfolio optimization is, for the most part, either "minimize risk given return" or "maximize return given risk." In other words, one component of the line is optimized given the other component. It can be shown that both objectives lead to the same set of optimal policies (the classic mean-variance efficient frontier).

The situation in the funding triangle "Commitment/Risk/Cost" is similar, although a bit more complicated. There are a few different objectives for the optimization of the funding triangle. Similar to the two-dimensional problem, these objectives are largely formulated according to the principle "one component of the funding triangle is optimized given the other two" (or, in short, "given two, optimize the third"). For example, given cost (the percentage of salary contributed to a DC plan) and commitment (the desired post retirement standard of living), one can minimize risk (the probability that this commitment will be funded). It can be shown that the "given two, optimize the third" type of objectives lead to the same set of optimal policies. More on this subject is presented in subsequent sections.

1.3. Basic Definitions and Assumptions

Firstly, objects under consideration will be defined. Think of an investor with a financial commitment to fund. The definitions of commitment and cost are relatively straightforward. A commitment is defined as a series of future payments that may be of uncertain timing, magnitude, and likelihood, as was discussed before. Cost is defined as a stream of future contributions that, along with the existing assets and invested returns, will be used to fund the commitment. These contributions may be of uncertain timing, magnitude, and likelihood as well.

The concept of risk is not that as clear-cut as the definitions of commitment and cost. Investors usually face a multitude of risks, so risk is a multi-headed creature. Therefore, risks must be prioritized. CDI is based on the following two assumptions.

1. The investor's primary objective is to fund the commitment.
2. The investor's primary risk is the failure of the primary objective. In other words, the primary risk is to have a "shortfall," i.e. insufficient assets to make one or more of the commitment's payments.

It should be emphasized that the primary risk is defined as an event the investor wishes to avoid. In order to manage this risk, such risk must be measured, and there are several measurements of this risk. These measurements include, but are not limited to, the probability of the "event-to-avoid" to happen, the size of the shortfall if it happens (the conditional shortfall mean), the expected shortfall (the probability of shortfall times the size of shortfall), and the volatility of shortfall if it happens (the conditional shortfall variance).

This disclosure focuses primarily on the probability of shortfall due to its importance and simplicity. Consequently, the risk tolerance is usually expressed as the probability that a particular cost structure is insufficient to fund the commitment. It must be underscored, however, that other measurements are also important for a comprehensive risk analysis.

1.4. Required Assets

This section introduces the analytical tools necessary for the cost-risk analysis of financial commitments.

As an example, consider a participant of a DC plan that has made a commitment to fund a certain level of post-retirement spending. Another example, which fits into the same analytical framework, would be a DB plan that has made a commitment to make a series of payments to the plan participants. The payment in year k has a fixed component $B_k$ and compounded volatility component $(1+I_1)\ldots(1+I_k)$. For example, $I_1, \ldots, I_N$ may be considered as the rates of inflation in corresponding years. As a result, the actual payment is equal to $B_k(1+I_1)\ldots,(1+I_k)$, $1 \leq k \leq n$.

How much money should be contributed now in order to have enough money to make this payment? If $ra_k$ is the amount of money invested in a policy portfolio X, $R_k$ and $I_k$ are the portfolio return and volatility in year k, then $ra_k$ plus the portfolio return should be equal to the actual payment. In other words, $$ra_k(1+R_1)\ldots(1+R_k) = B_k(1+I_1)\ldots(1+I_k)$$

Therefore, $$ra_k = \frac{B_k(1+I_1)\ldots(1+I_k)}{(1+R_1)\ldots(1+R_k)}$$

Taking a sum for all k, the asset value RA required to fund all promised payments is equal to $$RA = \sum_{k=1}^{n} \frac{B_k(1+I_1)\ldots(1+I_k)}{(1+R_1)\ldots(1+R_k)} \tag{1.4.1}$$

Random variable RA defined in (1.4.1) is called required assets associated with a portfolio X and the pension commitment described above.

If returns $R_1, \ldots, R_N$ and inflation rates $I_1, \ldots, I_N$ are known numbers, then the cost of funding the commitment would be a number equal to the RA as defined in (1.4.1). In reality, however, returns $R_1, \ldots, R_N$ and inflation rates $I_1, \ldots, I_N$ are uncertain. The cost of funding is still equal to RA as defined in (2). However, RA is no longer a known number but a random variable, and, as such, has a multitude of measurements (e.g. mean, median, standard deviation, percentiles, etc.) These values are of our great interest.

The concept of RA is a technical tool that translates the questions about the cost of funding into the language of the probability theory. Here's a summary of essential properties of the RAs.

1. RA is a random variable.
2. RA is a function of a policy portfolio.
3. RA reflects the riskiness of the policy portfolio as well as the volatility of the pension commitment.
4. RA is equal to the price of the matching asset if the assets are invested in the matching asset. Therefore, RA is a generalized "price" of the commitment funded by risky assets.
5. For a given observation of inflation rates $\{I_k\}$ and asset returns $\{R_k\}$, anything less than RA won't be enough to fund the promised payment; anything greater than RA will generate some surplus assets.
6. The $p^{th}$ percentile of RA is equal to the asset value required to fund the commitment with probability p %.

One of the biggest concerns for an investor is to achieve poor asset returns in the long-term. These poor long-term returns show up in the right tail of the corresponding RA. In technical terms, the investor's goal is to find a policy portfolio that moves the distribution of the corresponding RA to the left as much as possible and, at the same time, has the right tail that is not too "fat."

A portfolio optimization methodology that is based on the principles of CDI and designed to deal with this problem is presented in the next several sections. This methodology is fundamentally different from traditional portfolio optimization methodologies that concentrate on the analysis of portfolio return and its measurements (e.g., mean, variance, etc.). Since portfolio return is the primary object of analysis in these methodologies, they may be collectively called return based optimization (RBO) methodologies.

1.5. Return Based Optimization in Reverse

To put the relationship between CDI based optimization and RBO in its proper context, it is instructive to look at the basics of one of the most popular types of RBO—mean-variance optimization (MVO).

Given one dollar at the present, MVO minimizes the variability of the future value of this dollar given the mean of the future value. In other words, MVO assumes that the asset value is known at the present, and the problem is to minimize the volatility of the future value given the expected future value. Hence, the object MVO optimizes is in the future.

For an investor with a financial commitment to fund, the situation is exactly the opposite. The future value—the commitment—is relatively predictable. The present value—the existing asset value plus the present value of future contributions—is uncertain and much more volatile than the future value. Consequently, the roles of the future and present values are reversed in CDI compared to MVO.

In the simplest version of CDI, given one dollar in the future (the commitment), CDI minimizes the variability of the present value of this dollar given the mean of the present value. In other words, CDI assumes that the future asset value is known, and the challenge is to minimize the volatility of the present value given the expected present value. Hence, the object CDI optimizes is at the present. In a certain sense, CDI is MVO "in reverse," as MVO's "known present—optimized future" becomes CDI's "known future—optimized present."

Another distinction between CDI and RBO is the direction of investors' objectives. Investors want high portfolio returns and low RA. This distinction is the main source of certain "symmetry" between CDI and RBO, as will be seen in later sections.

These observations suggest another way to think about the relationship between CDI and RBO. The main object of RBO is portfolio return; the main object of CDI is RA. One of the biggest deficiencies of RBO is the fact that portfolio return "knows" nothing about the investor and its financial commitments. One may think of CDI as an attempt to remove this deficiency by virtue of replacing portfolio return as the primary object of analysis by RA, which, by definition, "knows" something about the investor's policy portfolio and financial commitments.

1.6. Return Based Optimization

To demonstrate the analogies between CDI and RBO, the two methodologies are presented in this and following sections and then arranged side-by-side for sake of comparison.

This section presents two types of RBO: Harry Markowitz's mean-variance optimization (MVO) and Arthur Roy's "Safety-First" approach (SF). Both approaches were introduced in 1952. (See Markowitz, H. M. [1952]. Portfolio Selection, Journal of Finance, Vol. VII, No. 1 (March), 1952; and Roy, A. D. [1952]. Safety First and the Holding of Assets, *Econometrica*, Vol. 20 (July), 1952.)

It is assumed that n asset classes represent investment opportunities available to a particular investor. The annual returns for these asset classes are random variables denoted as $\{A_i\}_{i=1}^n$. Throughout this disclosure, it is assumed that the joint distribution for the series of returns $\{A_i\}_{i=1}^n$ is continuous. It is also assumed that this distribution has a vector of mean returns $\mu$ and a covariance matrix $\sigma$.

The investor has to decide now how to allocate assets among the n asset classes. In other words, the investor has to determine a vector X (such that $X^T=(X_1, \ldots, X_n)$), where $X_i$ is the portion of total assets invested in the asset class i. For the purposes of this disclosure, it is assumed that:

$$X_i \geq 0 \text{ for all } i \text{ and } \sum_{i=1}^n X_i = 1.$$

The main object of MVO is portfolio return $$R_X = \sum_{i=1}^n X_i A_i = X^T A.$$

The mean, variance, and standard deviation of the random variable R are calculated as:

Mean:

$$E_X = E(R_X) = \sum_{i=1}^n X_i \mu_i = X^T \mu$$

Variance:

$$V_X = \text{Var}(R_X) = \sum_{i=1}^n \sum_{j=1}^n X_i X_j \sigma_{ij} = X^T \sigma X \qquad (1.6.1)$$

Standard Deviation: $S_X = (V_X)^{1/2}$

Mean-Variance Optimization (H. Markowitz)

Certain criteria are needed to compare various portfolios. It is commonly assumed that the "utility" (or "usefulness") of a portfolio can be valued using the first and second moments of the portfolio's return.

For a given portfolio X and risk tolerance parameter $t \geq 0$, utility u is defined as $$u = E_X - t S_X \qquad (1.6.2)$$

In a way, expected return $E_X$ is the investor's "reward," and $tS_X$ is the investor's "penalty" for risk taking. Then utility u, which is equal to the difference between "reward" $E_X$ and "penalty" $tS_X$ in (1.6.2), represents the "usefulness" of portfolio X at risk tolerance $t \geq 0$.

If risk tolerance parameter t is given, it is desirable for the portfolio to be as "valuable" as possible. In other words, utility u should be maximized. For example, if $t=0.5$ and portfolios X and Y are such that $$1\% = E_X - 0.5 S_X$$

$$2\% = E_Y - 0.5 S_Y$$

then portfolio Y is more valuable—its utility is higher (2%>1%) for a given risk tolerance $t=0.5$.

If utility u is given, it is desirable for u to be as many standard deviations below the mean as possible. For example, if $u=1\%$ and portfolios X and Y are such that $$1\% = E_X - 0.2 S_X$$

$$1\% = E_Y - 0.3 S_Y$$

then portfolio Y is more valuable—given utility 1%, it can "withstand" a harsher penalty (0.3>0.2) without losing its utility.

Therefore, the following three portfolio optimization problems are applicable to Mean-Variance Optimization.

Problem 1 (the highest risk tolerance problem). For a given utility u, find policy portfolio X that maximizes risk tolerance $t \geq 0$.

Problem 2 (the highest utility problem). For a given risk tolerance $t \geq 0$, find policy portfolio X that maximizes utility u.

Problem 3 (the standard form of MVO). For a given mean return value E, find portfolio X that minimizes standard deviation of return and $E_X \geq E$.

In these problems, portfolio X is called mean-variance efficient if it has the lowest standard deviation ($S_X \leq S_Y$) among all portfolios Y with the same or greater expected return ($E_Y \geq E_X$).

Proposition 1 is set forth below.
(a) The highest risk tolerance and highest utility problems generate the same set of efficient portfolios.
(b) The solutions to the highest risk tolerance and highest utility problems are mean-variance efficient.

Safety-First Optimization (A. Roy)

For a given portfolio X, let threshold return r be equal to the $p^{th}$ percentile of portfolio return $R_X$, namely:

$$p = Pr(R_X < r) \quad (1.6.3)$$

Given threshold return r, it is desirable for probability p to be as low as possible. For example, if r=1% and portfolios X and Y are such that both the $30^{th}$ percentile of $R_X$ and the $20^{th}$ percentile of $R_Y$ are equal to 1%, namely $$30\% = Pr(R_X < 1\%) \text{ and } 70\% = Pr(R_X \geq 1\%)$$

$$20\% = Pr(R_Y < 1\%) \text{ and } 80\% = Pr(R_Y \geq 1\%)$$

then portfolio Y is more valuable—its safety level is higher (80%>70%) for a given threshold return r.

Given probability p, it is desirable for threshold return r to be as low as possible. For example, if p=70% and portfolios X and Y are such that the $70^{th}$ percentile of $R_X$ and the $70^{th}$ percentile of $R_Y$ are equal to 1% and 2% respectively, namely $$30\% = Pr(R_X < 1\%)$$

$$30\% = Pr(R_X < 2\%)$$

then portfolio Y is more valuable—it provides higher return for a given risk (2%>1%).

Similar to MVO, the following two optimization problems are applicable to Safety-First Optimization.

Problem 4 (the highest safety problem). Let threshold return r be equal to the $p^{th}$ percentile of portfolio return $R_X$. For a given threshold return r, find policy portfolio X that minimizes probability p.

Problem 5 (the highest return problem). Let threshold return r be equal to the $p^{th}$ percentile of portfolio return $R_X$. For a given probability p, find policy portfolio X that maximizes threshold return r.

Proposition 2 is set forth as follows: The highest safety and highest return problems generate the same set of efficient portfolios.

While MVO and Safety-First are somewhat similar, there is at least one major difference between them. Safety-First concentrates on reducing the odds of a disaster unconcerned about the disaster's severity. In contrast, MVO "knows" something about the full range of outcomes—both upside and downside, even though it does not minimize the chance of a disaster.

1.7. RA Based Optimization

Let us consider an investor with a financial commitment to fund. We are ready to present a methodology that answers questions 1-4 put forward in section "Cost and Risk." The methodology is based on the following understanding of the role of the policy portfolio. The primary objective of the policy portfolio selection is to maximize the likelihood that a particular commitment will be funded and, at the same time, minimize the cost of funding.

Throughout this disclosure, the following assumptions are made.

1. The timing of all payments is the end of the year.
2. Annual rates of inflation $I_1, \ldots I_n$ represent lognormal random walk.
3. Annual portfolio returns $R_1, \ldots R_n$ represent lognormal random walk.

For a particular commitment and a portfolio X, the mean and the standard deviation of RA associated with the commitment and the portfolio are denoted as $E_X$ and $S_X$ correspondingly. (Note that $E_X$ and $S_X$ the mean and standard deviation for the portfolio return.) Obviously, we need formulas for the calculations of $E_X$ and $S_X$ similar to the ones presented in (3). Chapter 2 contains detailed formulas for the calculations of $E_X$ and $S_X$.

CDI and Mean-Variance Optimization

Let us present a version of CDI analogous to MVO. The asset value a required to fund the commitment at a given risk tolerance parameter $t \geq 0$ is defined as $$a = E_X + t S_X \quad (1.7.1)$$

In a way, expected RA $E_X$ is the investor's "reward," and $tS_X$ is the investor's "penalty" for risk taking. Then required asset value a, which is equal to the sum between "reward" $E_X$ and "penalty" $tS_X$ in (1.7.1), represents the "usefulness" of portfolio X at risk tolerance $t \geq 0$.

It is instructive to compare formulas (1.6.2) and (1.7.1). Clearly, (1.6.2) and (1.7.1) are analogous, yet different: while (1.6.2) contains a minus, (1.7.1) contains a plus. The "utility" of a portfolio in (1.6.2) is equal to the difference between "reward" $E_X$ and "penalty" $tS_X$. The "utility" of a funding solution in (1.7.1) is equal to the sum of "reward" $E_X$ and "penalty" $tS_X$. This is a reflection of the directional difference between CDI and MVO discussed in prior sections—investors want high returns and low RA. This section demonstrates that the optimization problems generated by these formulas are also analogous but different.

Given asset value a, we want a to be as many standard deviations above the mean as possible. The asset value a represents the cost of funding, and the investor wants to maximize the "utility, i.e. the portion of the distribution of RA to the left of a. For example, if a=100 and portfolios X and Y are such that $$100 = E_X + 0.2 S_X$$

$$100 = E_Y + 0.3 S_Y$$

portfolio Y is more valuable—it provides a better chance (0.3>0.2) to fund the promised payments at a given cost.

Given risk tolerance parameter t, we want the asset value a to be as low as possible. The asset value a represents the cost of funding, and the investor wants to minimize this cost at a given level of risk. For example, if t=0.5 and portfolios X and Y are such that $$200 = E_X + 0.5 S_X$$

$$100 = E_Y + 0.5 S_Y$$

portfolio Y is more valuable—it requires less money upfront (100<200) at for a given risk tolerance parameter t=0.5.

Therefore, we have the following portfolio optimization problems.

Problem 6 (the highest risk tolerance problem). For a given asset value a, find policy portfolio X that maximizes risk tolerance parameter $t \leqq 0$.

Problem 7 (the lowest cost problem). For a given risk tolerance parameter $t \geqq 0$, find the portfolio X that minimizes the asset value a.

Problem 8 (the standard form of CDI). For a given mean RA value E, find policy portfolio X that minimizes standard deviation of RA and $E_X \leqq E$.

In this context, portfolio X is called cost-risk efficient if the RA associated with X has the lowest standard deviation ($S_X \leqq S_Y$) for all portfolios Y with the same or lower mean of RA ($E_Y \leqq E_X$).

Proposition 3 is set forth below.
a) The highest risk tolerance and the lowest cost problems generate the same sets of efficient portfolios.
b) The solutions to the highest risk tolerance and the lowest cost problems are cost-risk efficient portfolios.

Comparative Table 1 (below) recaps the similarities and dissimilarities between CDI and MVO.

CDI and Safety-First Optimization

Let us present a version of CDI analogous to Safety-First.

One of the basic properties of the RA associated with a commitment and a policy portfolio is the asset value required to fund the commitment is equal to the $p^{th}$ percentile of the RA. If asset value a is given and equal to the $p^{th}$ percentile of the RA, we may want to "pull" the distribution of the RA as far to the left as possible, so a would be equal to the highest possible percentile of the distribution. By doing so, we maximize the probability of funding given asset value a.

COMPARATIVE TABLE 1

Commitment Driven Investing (CDI) vs. Mean-Variance Optimization (MVO)

|  | CDI | MVO |
| --- | --- | --- |
| Object of Analysis | Required Assets (RA) | Portfolio Return |
| Object Preferred | Low | High |
| Equation | $a = E_X + t S_X$ | $u = E_X - t S_X$ |
|  | $E_X$ is mean of RA, | $E_X$ is mean return |
|  | $S_X$ is standard deviation of RA | $S_X$ is standard deviation of return |
| Optimization Problems | Given a, Maximize t | Given u, Maximize t |
|  | Given t, Minimize a | Given t, Maximize u |

For a given portfolio X, asset value a required to fund the commitment be equal to the $p^{th}$ percentile of corresponding $RA_X$, namely $$p = Pr(RA_X < a) \quad (7)$$

Given required asset value a, we want probability p to be as high as possible. For example, if a=100 and portfolios X and Y are such that both the $70^{th}$ percentile of $RA_X$ and the $80^{th}$ percentile of $RA_Y$ are equal to 100, namely $$70\% = Pr(RA_X < 100)$$

$$80\% = Pr(RA_Y < 100)$$

then portfolio Y is more valuable—its safety level is higher (80%>70%) for a given required asset value a.

Given probability p, we want to achieve this level of safety at the lowest cost and minimize a. For example, if p=70% and portfolios X and Y are such that the $70^{th}$ percentile of $RA_X$ and the $70^{th}$ percentile of $RA_Y$ are equal to 200 and 100 respectively, namely $$70\% = Pr(RA_X < 100)$$

$$70\% = Pr(RA_Y < 50)$$

then portfolio Y is more valuable—it provides lower cost (50<100) for a given risk.

As a result, we have the following two optimization problems.

Problem 9 (the lowest risk problem). Let required asset value a be equal to the $p^{th}$ percentile of $RA_X$. For a given asset value a, find policy portfolio X that maximizes probability p.

Problem 10 (the lowest cost problem). Let required asset value a be equal to the $p^{th}$ percentile of $RA_X$. For a given probability p, find policy portfolio X that minimizes asset value a.

Proposition 4 follows: The lowest risk and lowest cost problems generate the same set of efficient portfolios.

Propositions 3 and 4 present an important property of CDI as related to DB plans. It is reasonable to believe that it would be in the best interests of plan participants to have a policy portfolio that maximizes the safety of their pensions at a given level of resources contributed to the plan. It is also reasonable to believe that it would be in the best interests of taxpayers for a public plan or for shareholders of a corporate plan to have a policy portfolio that minimizes the cost of running the plan at an acceptable level of risk. Remarkably, Propositions 3 and 4 show that policy portfolios that represent the best interests of taxpayers/shareholders and plan participants belong to the same cost-risk efficient frontier.

Comparative Table 2 recaps the similarities and dissimilarities between CDI and Safety-First.

COMPARATIVE TABLE 2

Commitment Driven Investing (CDI) vs. Safety-First (SF)

|  | CDI | SF |
| --- | --- | --- |
| Object of Analysis | Required Assets (RA) | Portfolio Return |
| Object Preferred | Low | High |
| Equation | $p = Pr(RA_X < a)$ | $p = Pr(R_X < r)$ |
| Optimization Problems | Given a, Maximize p | Given r, Minimize p |
|  | Given p, Minimize a | Given p, Maximize r |

The comments regarding the similarities and dissimilarities between MVO and Safety-First are applicable to the MVO and Safety—First versions of CDL The solutions to the equation (6) based optimization "know" something about the full range of outcomes of the cost of funding, even though it does not minimize the chance of a disaster. In contrast, the solutions to the equation (7) based optimization concentrates on reducing the odds of a disaster unconcerned about the disaster's severity.

2.1. Method Steps and Their Implementation

FIG. 1 provides a flowchart reflecting inputs and major steps to be performed in implementing a method according to one embodiment of the present invention.

1 Eliciting or providing Inputs: e.g., demographic data and economic assumptions.
2. Calculating Required Assets (RA): representing a stochastic present value of future cash flows.
3. Moments of RA: the calculations of at least two, more preferably three, and most preferably four, moments of RA.
4. Matching Distributions: e.g., lognormal shifted and inverse gamma shifted distributions and their mixtures.
5. Optimization and Risk Analysis: optimization algorithms (CDI mean-variance, CDI safety-first, etc.), the calculations of probability of shortfall, conditional average shortfall, conditional variance of shortfall.

The inputs presented in this section are necessary for the efficient glide path design for defined benefit (DB) and defined contribution (DC) plans. In case of DC plans, these inputs are utilized for custom target date funds (which are designed for cohorts of plan participants) or discretionary managed accounts (which are designed for individual plan participants). These inputs can be categorized into three major groups: demographic data, economic assumptions and "risk path"—a series of risk tolerance measurements that specify the desired level of risk in future years.

2.2. Inputs

The inputs presented in this section are necessary for the efficient glide path design for defined benefit (DB) and defined contribution (DC) plans. In case of DC plans, these inputs are utilized for custom target date funds (which are designed for cohorts of plan participants) or discretionary managed accounts (which are designed for individual plan participants). These inputs can be categorized into three major groups: demographic data, economic assumptions and "risk path"—a series of risk tolerance measurements that specify the desired level of risk in future years.

Demographic Data—DC Plans
1. Plan Provisions.
2. Age. The actual age for a retirement plan participant, or the average age for a group of plan participants.
3. Future Working Years. The number years until retirement for a plan participant or the average number years until retirement for a group of plan participants. There can be multiple retirement dates with corresponding probabilities assigned to the dates.
4. Family Status. The size of the family a particular retirement program is supposed to support. It can be a plan participant alone, or the participant and the spouse with a certain percentage of the family income continuing to the surviving spouse.
5. Saving Rates. The percentage of salary contributed to the retirement account.
6. Existing Account Balances. The account existing balances as of the valuation date.
7. Mortality Rates. The rates of mortality utilized to project the lifespan of a participant and/or a family. These rates may be adjusted to produce cost estimates of varying degree of conservatism. Examples of such adjustments include, but are not limited to, that a plan participant and/or the spouse a) will survive until retirement; b) will survive until retirement plus a certain number of years; c) will outlive their life expectancy as provided by a particular mortality table.

Demographic Data—DB Plans
1. Plan Provisions, Benefit Package, Eligibility Requirements.
2. Age/Service. The actual ages and years of accrued service for all plan participants.
3. Family Status. Joint and survivor options available under the plan provisions.
4. Decrement Rates. The rates of mortality, retirement, disability, and turnover.
5. Other Population Assumptions. Other population assumptions may include the percentage of lump sum elections, the active population growth rate, the number of the plan's new entrants included in the analysis, employee contribution rates.

Note that the data can be individual or cohort based, in which case a particular data item is averaged for all representatives of the cohort.

Economic Assumptions
1. Capital Market Assumptions. Capital market assumptions include, but are not limited to, expected returns, risks and correlations for all asset classes under consideration. There can be several sets of such assumptions to accommodate different economic environments.
2. Inflation. Expected inflation, volatility of inflation, and the correlations of inflation with the asset classes.
3. Salary Growth. Expected salary growth, volatility of salary growth, and the correlations of salary growth with the asset classes under consideration.

Risk Path

Risk Path is a series of risk measurements assigned to each glide path period. For example, if a glide path is designed to change the structure of its portfolios annually, then a risk measurement is assigned to each year. These risk measurements include, but are not limited to, the probability that a particular post-employment standard of living will be achieved, the size of the conditional shortfall, and the volatility of the conditional shortfall. The simplest example of a risk path is a constant 90% likelihood of achieving a desired standard of living in all years in the glide path.

2.3. Financial Commitments

Commitments must be defined first. As was defined in prior sections, a commitment is a series of future payments that may be of uncertain timing, magnitude, and likelihood. A commitment's payments may have different volatilities, and it is constructive to separate payments with similar volatilities into separate streams. This section presents the makeup of the commitments utilized in the optimization process.

Commitments for DC Plans

There are four major components of a DC plan participant's commitment:
1. Post-employment spending. One or more streams containing payments that fund the participant's lifestyle. These streams are usually based on the ratio of the desired post-employment income to the last salary (the replacement ratio). These streams should be adjusted for consumer inflation. Mortality and retirement rates may be utilized in the calculations of these streams.
2. Savings (including contributions to the plan). One or more streams containing payments to the Plan as well as other saving and/or investment programs (IRA, taxable accounts, etc.). These streams are usually expressed as a percentage of compensation and adjusted for wage inflation. Mortality and retirement rates may be utilized in the calculations of these streams.

3. Annuity purchases (if any). In case the participant wishes to (partially) annuitize his/her retirement needs, this stream contains one or more payments to the providers of annuity products. The volatility of these payments clearly depends on the volatility of annuity prices.

4. Annuity payments (if any). In case the participants wishes to (partially) annuitize his/her retirement needs, there are one or more streams of annuity payments. These payments may depend on various factors; for example, there may be a flat dollar annuity and inflation adjusted annuity.

Commitments for DB Plans

There are four major components of a DB plan participant's commitment:

1. Benefits streams. One or more streams of payments promised to the plan participants. These payments may be segregated in separate streams for active and inactive participants. If more detailed analysis is desirable, separate streams can be built for each year of retirement. These streams should be adjusted for wage inflation before retirement and consumer inflation (if provided by the plan) after retirement. The calculations of these streams utilize mortality, disability, turnover, and retirement rates, along with other population assumptions.

2. Plan contributions. A stream of employer and employee (if any) contributions is usually expressed as a percentage of payroll. This stream should be adjusted for wage inflation. Mortality, disability, turnover, and retirement rates are utilized in the calculations of these streams.

3. Matching bond portfolio and annuity purchases (if any). If the plan wishes to purchase "buy-and-hold" assets like group annuity contracts and/or matching bond portfolios, this stream contains the prices of such assets.

4. Matching bond portfolio and annuity payments (if any). If the plan wishes to purchase "buy-and-hold" assets like group annuity contracts and/or matching bond portfolios, this stream contains the payments from such assets.

2.4. Required Assets

Required Assets (RA) is random variable that is the asset value required at the present in order to fund the commitment. RA is the main object of our analysis. It is assumed that the commitment has m streams, and each stream has no more than n non-zero payments. RA associated with glide path $\{R_k\}$ and commitment $\{P_{pq}\}$ is defined as $$RA = \sum_{p=1}^{m}\sum_{q=1}^{n} \frac{P_{pq}}{(1+R_1) \dots (1+R_q)} \quad (2.4.1)$$

where $R_k$ is the glide path policy in year k, $P_{pq}$ is the q-th payment in stream p. It is also assumed that $P_{pq}$ has two types of volatility:

1. $L_{pq}$ is specific to year q and independent of $L_{pt}$, t≠q.
2. $(1+V_{p1}) \dots (1+V_{pq})$ is compounded volatility in years from 1 to q.

Therefore, $P_{pq}$ has the following form:

$$P_{pq}=B_{pq}L_{pq}(1+V_{p1})\dots(1+V_{pq}) \quad (2.4.2)$$

where $B_{pq}$ is a fixed number. From (2.4.2) and (2.4.1), RA has the following form.

$$RA = \sum_{p=1}^{m}\sum_{q=1}^{n} B_{pq} L_{pq} \frac{(1+V_{p1}) \dots (1+V_{pq})}{(1+R_1) \dots (1+R_q)} \quad (2.4.3)$$

The following simplifying notation is now introduced.

$$V_p^{(q)}=(1+V_{p1})\dots(1+V_{pq}) \quad (2.4.4)$$

$$V^{(0)}_p=0$$

$$R^{(q)}=(1+R_1)\dots(1+R_q) \quad (2.4.5)$$

for all p≦m and q≦n. Substituting (2.4.4) and (2.4.5) into (2.4.3), we get $$RA = \sum_{p=1}^{m}\sum_{q=1}^{n} B_{pq} L_{pq} \frac{V_p^{(q)}}{R^{(q)}} \quad (2.4.6)$$

For the glide path design, RAs also need to be calculated for partial commitments at various points k≦n in the future.

$$RA = \sum_{p=1}^{m}\sum_{q=k}^{n} B_{pq} L_{pq} \frac{(1+V_{p1}) \dots (1+V_{pq})}{(1+R_k) \dots (1+R_q)} = \quad (2.4.7)$$

$$\sum_{p=1}^{m} V_p^{(k-1)} \sum_{q=k}^{n} B_{pq} L_{pq} \frac{(1+V_{pk}) \dots (1+V_{pq})}{(1+R_k) \dots (1+R_q)}$$

The following may be defined:

$$S_{pk} = \sum_{q=k}^{n} B_{pq} L_{pq} \frac{(1+V_{pk}) \dots (1+V_{pq})}{(1+R_k) \dots (1+R_q)} \quad (2.4.8)$$

From (2.4.7) and (2.4.8), the following is obtained $$RA_k = \sum_{p=1}^{m} V_p^{(k-1)} S_{pk} \quad (2.4.9)$$

In particular, $$RA = \sum_{p=1}^{m} S_{p1} \quad (2.4.10)$$

2.5. Moments of Required Assets

As was discussed in prior sections, the distribution of RA is critical to the development of solutions to the funding problem. Unfortunately, a close form of RA's density function is not known at the present. Therefore, the challenge is to provide reasonable estimates of the distribution of RA.

The first step in the development of these estimates is to calculate the moments of RA and $RA_k$, k≦n. The estimates presented in this disclosure are based on first four moments of RA, i.e. expected values $E((RA_k)^N, N=1, 2, 3, 4, k≦n$. From (2.4.9), we have $$E((RA_k)^N) = E\left(\left(\sum_{p=1}^{m} V_p^{(k-1)} S_{pk}\right)^N\right) \quad (2.5.1)$$

Therefore, the problem is to calculate powers of sums in the form of $$\left(\sum_{p=1}^{m} X_p\right)^N$$

and, consequently, their expected values $$E\left(\left(\sum_{p=1}^{m} X_p\right)^N\right),$$

where $X_p = V_p^{(k-1)} S_{pk}$. These calculations are quite laborious, and since they are used in the optimization process numerous times, it is vital to perform them as efficiently as possible. The following result is the first step in the process of these calculations. This proposition determines the building blocks for efficient calculations of the power of sums.

Proposition 2.5.1 is provided in the accompanying FIGS. 2A-2D. Applying expected values to (2.5.2), (2.5.3), (2.5.4) and (2.5.5) from Proposition 2.5.1, we get the following Corollary 2.5.2.

Corollary 2.5.2 is provided in the accompanying FIG. 2E. Under the conditions of Proposition 2.5.1, equations (2.5.6), (2.5.7), (2.5.8), and (2.5.9) may be presented. Corollary 2.5.2 shows that, in order to calculate the moments in (2.5.6), (2.5.7), (2.5.8) and (2.5.9), we need expected values $E(A_i^{(N)})$, $E(B_i^{(N)})$, $E(C_i^{(N)})$ and $E(D_i^{(N)})$, $N=1, 2, 3, 4, i \leq m$. The following proposition provides these values.

Proposition 2.5.3 is provided in the accompanying FIGS. 3A-3D, including equations (2.5.10), {2.5.11}, (2.5.12), and (2.5.13). Proposition 2.5.3 demonstrates that, in order to calculate $E(A_i^{(N)})$, $E(B_i^{(N)})$, $E(C_i^{(N)})$ and $E(D_i^{(N)})$, $N=1, 2, 3, 4$, $i \leq m$, we need expected values like $E((V_P^{(k-1)})^a(V_q^{(k-1)})^b(V_t^{(k-1)})^c(V_u^{(k-1)})^d)$ and $E((S_{pk})^a(S_{qk})^b(S_{tk})^c(S_{uk})^d)$. Values $E((V_P^{(k-1)})^a(V_q^{(k-1)})^b(V_t^{(k-1)})^c(V_u^{(k-1)})^d)$ don't depend on any portfolio and, since all volatilities are assumed to be lognormal, these values can be calculated as follows.

Proposition 2.5.4. is provided as follows.
Let $\{X_i\}$ be a series of lognormal random variables, $X_i = \exp(A_i)$, $E(X_i) = m_i$, $\text{Var}(X_i) = s_i^2$, $\gamma_{ij} = \text{Corr}(X_i, X_j)$, $$\rho_{ij} = 1 + \frac{s_i s_j \gamma_{ij}}{m_i m_j},$$

$E(A_i) = \mu_i$, $\text{Var}(A_i) = \sigma_i^2$, $\text{Cov}(A_i, A_j) = \sigma_{i,j}$, $\exp(\sigma_{i,j}) = \rho_{ij}$, $1 \leq i \leq n+1$. Then $$E\left(\frac{\prod_{i=1}^{n} X_i}{X_{n+1}^k}\right) = \frac{\prod_{i=1}^{n} m_i}{m_{n+1}^k} \rho_{n+1,n+1}^{\frac{1}{2}k(k+1)} \frac{\prod_{i=1}^{n} \prod_{j=1}^{i-1} \rho_{i,j}}{\left(\prod_{i=1}^{n} \rho_{i,n+1}\right)^k}$$

Now, let's deal with expected values $E((S_{pk})^a(S_{qk})^b(S_{tk})^c(S_{uk})^d)$. The following is the list
$E(S_{pk})$
$E(S_{pk}^2)$
$E(S_{pk}^3)$
$E(S_{pk}^4)$
$E(S_{pk} S_{qk})$
$E(S_{pk}^2 S_{qk})$
$E(S_{pk} S_{qk}^2)$
$E(S_{pk} S_{qk} S_{tk})$
$E(S_{pk}^3 S_{qk})$
$E(S_{pk} S_{qk}^3)$
$E(S_{pk}^2 S_{qk}^2)$
$E(S_{pk}^2 S_{qk} S_{tk})$
$E(S_{pk} S_{qk}^2 S_{tk})$
$E(S_{pk} S_{qk} S_{tk}^2)$
$E(S_{pk} S_{qk} S_{tk} S_{uk})$ The direct calculations of these values are exceedingly difficult. However, it is possible to calculate these values using recurrent formulas, in which a particular expected value is calculated using the expected values calculated in prior steps. The following proposition presents such recurrent formulas for all expected values needed for the calculations of four moments of RA.

Proposition 2.5.5 is provided in the accompanying FIGS. 4A-4O. Given expected values $E((V_P^{(k-1)})^a(V_q^{(k-1)})^b(V_t^{(k-1)})^c(V_u^{(k-1)})^d)$ and $E((S_{pk})^a(S_{qk})^b(S_{tk})^c(S_{uk})^d)$, the process of calculation of moments $E((RA_k)^N)$ is complete.

2.6. Matching Theoretical Distributions.

In this section, it is assumed that the four moments of RA have been calculated, as described in the previous section. This section presents the process of selecting a known theoretical distribution whose moments match given four moments of RA (wherein the selected distribution may be deemed a matching distribution). As demonstrated in this section, the matching distribution is either a mixture of lognormal shifted and inverse gamma shifted distributions, or a mixture of negative lognormal shifted and negative inverse gamma shifted distributions.

Random variable (r. v.) Y is called lognormal shifted if $Y=e^X-a$, where X is a normal r. v. with parameters ($\mu$, $\sigma$) and a is a constant. Therefore, a lognormal shifted r. v. has three parameters. The following proposition shows how to calculate the three parameters given first three moments of a lognormal shifted r. v.

Proposition 2.6.1 is provided as follows. Let Y be a lognormal shifted r. v., $m_1 = E(Y)$, $m_2 = E(Y^2)$, $m_3 = E(Y^3)$, $V = m_2 - m_1^2$. Then $$a = t - m_1, \quad (2.6.1)$$

$$\sigma^2 = \ln(1 + V/t), \quad (2.6.2)$$

$$\mu = \ln t - \frac{1}{2}\ln(1 + V/t) \quad (2.6.3)$$

where t is the real root of a cubic polynomial $$t^3(m_3 - 3m_1 V - m_1^3) - 3V^2 t^2 - V^3 = 0 \quad (2.6.4)$$

(this polynomial has exactly one real root).

Random variable (r. v.) Y is called negative lognormal shifted if $Y = a - e^X$, where X is a normal r. v. with parameters ($\mu$, $\sigma$) and a is a constant. Therefore, a lognormal shifted r. v. has three parameters. The following proposition shows how to calculate the three parameters given first three moments of a negative lognormal shifted r. v.

Proposition 2.6.2 is provided as follows. Let Y be a negative lognormal shifted r. v., $m_1=E(Y)$, $m_2=E(Y^2)$, $m_3=E(Y^3)$, $V=m_2-m_1^2$. Then $$a=t+m_1, \quad (2.6.5)$$

$$\sigma^2=\ln(1+V/t), \quad (2.6.6)$$

$$\mu = \ln t - \frac{1}{2}\ln(1+V/t) \quad (2.6.7)$$

where t is the real root of a cubic polynomial $$t^3(m_3-3m_1V-m_1^3)+3V^2t^2+V^3=0 \quad (2.6.8)$$

It can be shown that this polynomial has exactly one real root.

Random variable Z is called inverse gamma shifted if $Z=X-b$, where X is an inverse gamma r. v. with parameters $(\alpha,\theta)$ (see Klugman, S. A., Panjer, H. H., Willmot, G. E. [1998]. Loss Models, Wiley Series in Probability and Statistics, 1998, p. 580).

Proposition 2.6.3 is provided as follows. Let Z be a inverse gamma r. v., $m_1=E(Z)$, $m_2=E(Z^2)$, $m_3=E(Z^3)$. Then a is a root of a quadratic polynomial $$a^2(m_3-3m_1m_2+2m_1^3)+a(2m_1m_3+2m_1^2m_2-4m_2^2)+2m_1^2m_3-m_2m_3-m_1m_2^2=0 \quad (2.6.9)$$

$$\alpha = \frac{(m_1+a)^2}{m_2-m_1^2}+2 \quad (2.6.10)$$

Random variable Z is called negative inverse gamma shifted if $Z=b-X$, where X is an inverse gamma r. v. with parameters $(\alpha, \theta)$.

Proposition 2.6.4 is provided as follows. Let Z be a negative inverse gamma r. v., $m_1=E(Z)$, $m_2=E(Z^2)$, $M_3=E(Z^3)$. Then a is a root of a quadratic polynomial $$a^2(m_3-3m_1m_2+2m_1^3)+a(2m_1m_3+2m_1^2m_2-2m_1^2m_2-4m_2^2)+2m_1^2m_3-m_2m_3-m_1m_2^2=0 \quad (2.6.12)$$

$$\alpha = \frac{(a-m_1)^2}{m_2-m_1^2}+2 \quad (2.6.13)$$

$$\theta=(\alpha-1)(m_1+a) \quad (2.6.14)$$

Finally, here is the procedure for the selection of the distribution that matches four moments of RA $m_1$, $m_2$, $m_3$, and $m_4$ calculated according to the process outlined in the previous section.

1. Calculate cumulant $m_3-3m_1m_2+2m_1^3$.
2. If $m_3-3m_1m_2+2m_1^3>0$, then the desired distribution is a mixture of a lognormal shifted and an inverse gamma shifted distributions. Consequently, calculate the parameters of both lognormal shifted and inverse gamma shifted distributions that match first three moments $m_1$, $m_2$ and $m_3$ according to Proposition 2.6.1 and Proposition 2.6.3. Since both the lognormal shifted and the inverse gamma shifted distributions have the same first three moments (equal to $m_1$, $m_2$ and $m_3$), any mixture of these distributions has the same moments.
3. If $m_3-3m_1m_2+2m_1^3<0$, then the desired distribution is a mixture of a negative lognormal shifted and a negative inverse gamma shifted distributions. Consequently, calculate the parameters of both negative lognormal shifted and negative inverse gamma shifted distributions that match first three moments $m_1$, $m_2$ and $m_3$ according to Proposition 2.6.2 and Proposition 2.6.4. Since both the negative lognormal shifted and the negative inverse gamma shifted distributions have the same first three moments (equal to $m_1$, $m_2$, and $m_3$), any mixture of these distributions has the same moments.
4. In both cases, the mixture coefficient is calculated from the linear equation matching the forth moment $m_4$. The resulting mixture of distributions matches all four moments $m_1$, $m_2$, $m_3$, and $m_4$.
5. If $m_3-3m_1m_2+2m_1^3=0$, then the desired distribution is a normal distribution that matches the first two moments $m_1$ and $m_2$.

2.7. Optimization and Risk Analysis

Given the analytic developments in prior sections, the desired glide path may be constructed according to the following steps.

1. Determine the time horizon and the number of periods ("glide periods") that have different portfolios.
2. Determine the risk tolerance measurement type for the construction. The appropriate measurement types may include, but not limited to, CDI mean-variance and CDI safety-first based measurements as well as their combinations, as described in section 1.7
3. For the selected risk tolerance measurement type, determine the risk tolerance level for each glide period ("the risk path").
4. Generate the glide path via performing optimizations in each glide period using the chosen risk tolerance measurement types and levels (selected in items 2 and 3 above) starting with the last glide period going backwards. More precisely, the optimal portfolio is selected for the last glide period using the chosen risk tolerance measurement types and levels. This portfolio is subsequently utilized in a similar optimization procedure in the glide period immediately preceding the last one. Similarly, if optimal portfolios have been chosen for a series of consecutive glide periods until the last one, then these portfolios are utilized to find the optimal portfolio in the glide period immediately preceding the series. The process continues until optimal portfolios have been selected for all glide periods. It is proven that this glide path represent the Nash equilibrium solution for the funding problem.
   An optimizer is required for these calculations in every glide period; such optimizers are widely available on most PCs. The optimal portfolio in each glide period is selected using the optimal portfolios selected in prior glide periods. As a result, a comprehensive saving and investment program is produced using common demographic and capital market assumptions along with a simple set of risk preferences.
5. Perform the risk analysis of the commitment and the glide path. The values of interest include are but not limited to, the probabilities of shortfall and surplus, the sizes of shortfall and surplus, the volatilities of shortfall and surplus. This analysis is possible solely due to the availability of a known distribution that matches the moments of the corresponding RA. For a DB plan, the values of interest include, but are not limited to, the distribution of long-term cost of funding the plan, the stochastic projections of minimum required contributions, funded ration, unfunded liability, and other elements of financial reports. For a DC plan, the values of interest include, but are not limited, the distribution of replacement ratio, sustainable levels of spending, and complete/partial annuitization 2.8. Examples The advantages and features of the invention are further illustrated with reference to the following examples, which are not to be construed as in any way limiting the scope of the invention but rather as illustrative of an embodiment of the invention in specific applications thereof.

This section presents several examples of the applications of the methodology presented in the prior sections to specific groups of DC plan participants at different levels of risk tolerance.

Let us consider a group of DC plan participants with the following characteristics.

1. Average age is 40.
2. Average account balance is $40,000.
3. Average salary is $50,000.
4. Average plan contribution rate is 9% (including the employer's matching contributions).
5. Average retirement age is 65.
6. The male/female split is 50/50.
7. The percentages of married participants are 80% for males and 60% for females.
8. In case of death in retirement, the married participants wish to provide 70% of their joint income to the surviving spouse.
9. Male spouses are (on average) three years older than their spouses are. Female spouses are (on average) three years younger than their spouses are.
10. The rates of mortality are assume to follow the mortality table issued by the IRS to be used in determining current liability under section 412(1)(7) for participants and beneficiaries (other than disabled participants) for plan years beginning in 2007.

The long-term capital market assumptions are presented in FIG. 5.

This section presents the investment and saving programs assuming a constant risk tolerance at 70%, 80% and 90%. In other words, it is assumed that the plan participants wish to achieve a certain post-employment standard of living with a given likelihood (namely, 70%, 80% and 90%). The post-employment standard of living is expressed as a replacement ratio—a percentage of the last working year's salary that is funded by the investment and saving program. A replacement ratio is a random variable; its distribution is of a participant's great interest.

The results of the optimization runs for the risk tolerance level 70% are presented in FIGS. 6A and 6B. FIG. 6A shows the portfolios year by year for the next 80 years (from ages 40 to 120) as an area chart. FIG. 6B shows selected percentiles of the replacement ratio.

Figure 7:
FIG. 7A is an area chart providing a graphical representation of a glide path generated in an example utilizing a method according to the present invention, with the glide path including portfolio allocations for a plan participant between ages 40-120 at a risk tolerance level ("safety") of 80%.
FIG. 7B is a table including a distribution of replacement ratio percentiles corresponding to the exemplary implementation embodied in FIG. 7A.

The results of the optimization runs for the risk tolerance level 80% are presented in FIGS. 7A and 7B. FIG. 7A shows the portfolios year by year for the next 80 years (from ages 40 to 120) as an area chart. FIG. 7B shows selected percentiles of the replacement ratio.

Figure 8:
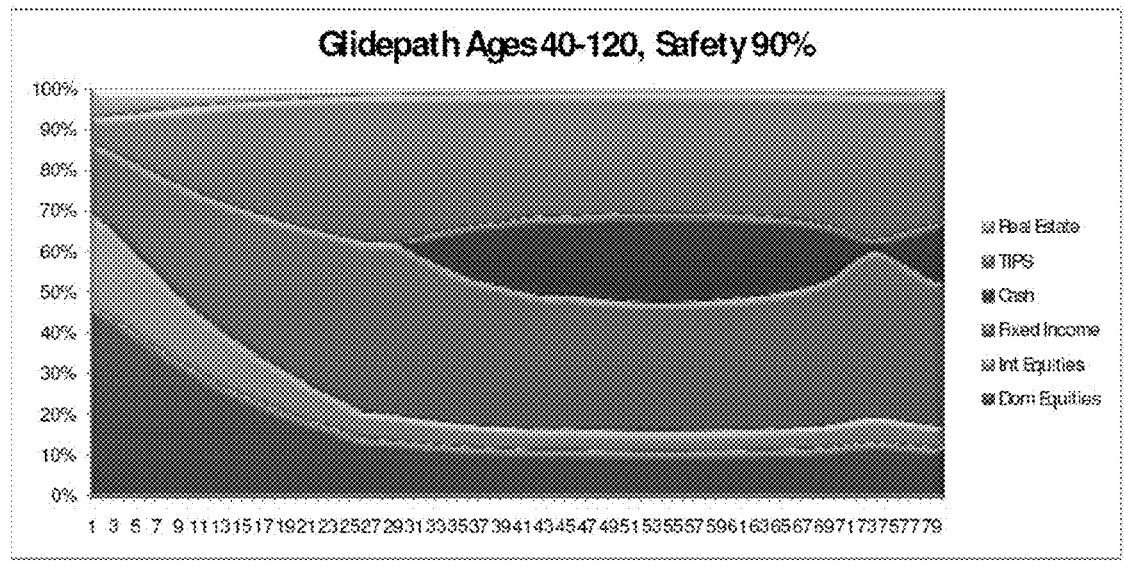
FIG. 8A is an area chart providing a graphical representation of a glide path generated in an example utilizing a method according to the present invention, with the glide path including portfolio allocations for a plan participant between ages 40-120 at a risk tolerance level ("safety") of 90%.
FIG. 8B is a table including a distribution of replacement ratio percentiles corresponding to the exemplary implementation embodied in FIG. 8A.

The results of the optimization runs for the risk tolerance level 90% are presented in FIGS. 8A and 8B. FIG. 8A shows the portfolios year by year for the next 80 years (from ages 40 to 120) as an area chart. FIG. 8B shows selected percentiles of the replacement ratio.

Utilization of the CDI Process

The main issues with respect to any saving and investment program are how much to save and how to invest the assets at the present and in the future. Clearly, it is desirable to optimize these programs in terms of minimizing the resources contributed to a particular program and maximizing the desired outcome of the program given the level of risk acceptable to the stakeholders of the program.

The CDI process described in prior sections is especially valuable because, by design, it maximizes the safety of the financial commitments, minimizes the cost of funding these commitments, and maximizes the monetary output of a particular program. These features of the process are useful for both DC and DB plans. The utilization of the CDI process is described separately for DC and DB plans below.

The CDI Process Applied to DC Plans

A target date fund or a similar fund, acting in the best interests of the plan participants, may utilize the CDI process to create a glide path that maximizes the post-employment standard of living for the participants. Alternatively, the plan may create a glide path that maximizes the safety of a pre-selected standard of living, and/or minimizes its cost. Due to the flexibility and comprehensiveness of the inputs to the process, the desired glide paths may be created for various cohorts of plan participants, separated not only by age and retirement date, but also by service, contribution rates, account balances, and other factors. As a result, a comprehensive customized family of target date funds may be created to maximize the likelihood that the plan participants would have a decent standard of living in retirement.

This process may have to be repeated on a regular basis (e.g. yearly) to fine-tune the program and account for possible deviations of actual results from the assumptions.

The CDI Process Applied to DC Plans

DB plans perform annual actuarial valuations to ensure compliance with relevant regulations. In addition, DB plans need to maximize the safety of the promised benefits (in the bests interests of plan participants) and minimize cost (in the best interests of taxpayers/shareholders). Similarly to the actuarial valuations, DB plans may utilize the CDI process to perform "asset-commitment" (or "asset-liability") valuations on a regular basis (e.g. yearly) in order to optimize the asset allocation, contribution and benefit policies all together.

Traditionally, DB plans have used stationary policy portfolios—fixed asset allocations that plans rebalance on a regular basis. However, similar to people, DB plans also get older and mature. Therefore, DB plans may need to employ more conservative portfolios as they mature in the future. So far, DB plans have not had a disciplined process to do so. The CDI process may provide them with the risk management tools to design a "DB glide path" and anticipate the changes in risk profile and the cost structure in advance. As a result, the CDI process may become an "early warning" system for DB plans.

Figure 9:
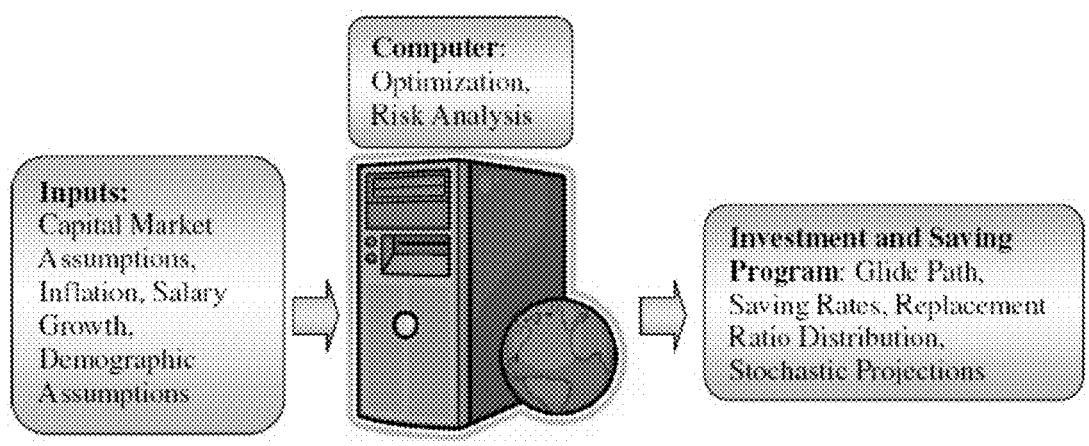
FIG. 9 is a flow diagram identifying process inputs to a computer, steps implemented by a computer, and process outputs including glide path, replacement ratio distribution, and stochastic projections associated with an asset allocation method according to the present invention.

FIG. 9 is a flow diagram identifying process inputs to a computer, steps implemented by a computer, and process outputs including glide path, replacement ratio distribution, and stochastic projections associated with an investing and saving program according to the present invention. Inputs may generally include capital market assumptions, inflation, salary growth, and demographic assumptions. Optimization and risk analysis steps are performed by a computer (e.g., a conventional personal computer) arranged to implement computer-readable software. Process outputs, such as glide path, replacement ratio distribution, and stochastic projections, may be organized, presented, and/or stored in any desirable user-perceptible or machine-readable form, including, but not limited to: visual display on a computer monitor or similar display device; printouts on paper or similar tangible media; audible output in the form of synthesized speech or other audible communication format; and/or a machine readable summary storable on a machine-readable memory device (e.g., flash memory, hard disc, magnetic tape, optical disc, and the like). Desirable output formats may include tables, charts, graphs, and relational data storage/access forms.

In one embodiment, capital is deployed among multiple asset classes, or capital deployment is adjusted among multiple asset classes, according to at least one time-dependent investment portfolio of a glide path generated by a method of the present invention. Such adjustment is preferably performed periodically (e.g., preferably annually, but possibly semi-annually, monthly, weekly, or according to another user-defined period) to promote attainment of the highest post-employment standard of living given a level of risk acceptable to the plan participant(s).

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A method for allocating assets of at least one participant of an investing plan, the method comprising:
   selecting a number of glide periods, with each glide period representing a future time period corresponding to a different investment portfolio;
   selecting a desired risk tolerance measurement type;
   determining a risk path representing at least one risk tolerance level assigned to the number of glide periods, wherein each glide period has an associated a risk tolerance level;
   calculating at least one risk measurement for the selected risk tolerance measurement type for each glide period of the number of glide periods utilizing at least one computer processor executing machine-readable instructions to perform said calculation;
   generating a glide path representing the Nash equilibrium solution for funding a future financial commitment, by performing computer-implemented optimizations for the number of glide periods utilizing at least one computer processor executing machine-readable instructions to generate said glide path and using the at least one risk tolerance level, wherein the glide path represents a series of time-dependent investment portfolios each subject to inclusion of multiple asset classes, with each investment portfolio corresponding to a glide period, and with each investment portfolio being subject to different percentages of different asset classes; and
   generating any of (A) a user-perceptible summary of the glide path; (B) a visual depiction of the glide path; and (C) a machine-readable summary of the glide path, using at least one computer processor in conjunction with at least one computer-compatible output device.

2. The method of claim 1, further comprising generating a distribution of replacement ratios corresponding to projected utilization of the glide path utilizing at least one computer processor executing machine-readable instructions to generate said distribution of replacement ratios, and generating any of (a) a user-perceptible summary of the distribution of replacement ratios; (b) a visual depiction of the distribution of replacement ratios; and (c) a machine-readable summary of the distribution of replacement ratios, using said at least one computer processor in conjunction with the at least one computer-compatible output device.

3. The method of claim 1, further comprising deploying capital or adjusting capital deployment among the multiple asset classes according to at least one time-dependent investment portfolio of the glide path.

4. The method of claim 1, comprising generating a machine-readable summary of the glide path, and further comprising storing said machine-readable summary to a machine-readable memory.

5. The method of claim 1, utilizing at least one input element arranged in communication with the at least one computer processor to receive user inputs comprising (i) said number of glide periods, (ii) said desired risk tolerance measurement type; and (iii) said risk path.

6. A non-transitory computer readable medium having stored thereon executable instructions embodied in the non-transitory computer readable medium and when executed by a processor of a computer performs steps comprising:
   eliciting user inputs for selection of a number of glide periods, with each glide period representing a future time period corresponding to a different investment portfolio;
   eliciting user inputs for selection of a desired risk tolerance measurement type;
   eliciting user inputs for determining a risk path representing at least one risk tolerance level assigned to the number of glide periods, wherein each glide period has an associated a risk tolerance level;
   calculating at least one risk measurement for the selected risk tolerance measurement type for each glide period of the number of glide periods utilizing at least one computer processor executing machine-readable instructions to perform said calculation;
   generating a glide path representing the Nash equilibrium solution for funding a future financial commitment, by performing computer-implemented optimizations for the number of glide periods utilizing at least one computer processor executing machine-readable instructions to generate said glide path and using the at least one risk tolerance level, wherein the glide path represents a series of time-dependent investment portfolios each subject to inclusion of multiple asset classes, with each investment portfolio corresponding to a glide period, and with each investment portfolio being subject to different percentages of different asset classes; and
   generating any of (A) a user-perceptible summary of the glide path; (B) a visual depiction of the glide path; and (C) a machine-readable summary of the glide path, using at least one computer processor in conjunction with at least one computer-compatible output device.

7. A computer comprising at least one computer-compatible output device, comprising at least one computer processor, and comprising the non-transitory computer readable medium of claim 6, wherein:
   said at least one computer processor is arranged to execute said executable instructions to perform said calculating step, and said glide path generating step; and
   said at least one computer processor is arranged to execute said machine readable instructions in conjunction with said at least one computer-compatible output device to perform said eliciting steps, and to generate any of (A) said user-perceptible summary of the glide path; (B) said visual depiction of the glide path; and (C) said machine-readable summary of the glide path.

* * * * *